United States Patent
Kolstad et al.

(10) Patent No.: US 6,353,086 B1
(45) Date of Patent: *Mar. 5, 2002

(54) LACTIC ACID RESIDUE CONTAINING POLYMER COMPOSITION AND PRODUCT HAVING IMPROVED STABILITY, AND METHOD FOR PREPARATION AND USE THEREOF

(75) Inventors: Jeffrey J. Kolstad, Wayzata; David R. Witzke, Minneapolis; Mark H. Hartmann, Minnetonka; Eric Stanley Hall, Crystal, all of MN (US); James Nangeroni, Doylestown, PA (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,927

(22) Filed: Jul. 24, 2000

Related U.S. Application Data

(63) Continuation of application No. 09/053,836, filed on Apr. 1, 1998, now Pat. No. 6,114,495.

(51) Int. Cl.[7] ............................................. C08G 63/08
(52) U.S. Cl. ...................... 528/354; 528/359; 528/361; 525/413; 525/415
(58) Field of Search .......................... 528/354, 361, 528/359; 525/413, 415

(56) References Cited

U.S. PATENT DOCUMENTS

| | | | |
|---|---|---|---|
| 5,084,553 A | 1/1992 | Hess et al. | 528/361 |
| 5,142,023 A | 8/1992 | Gruber et al. | 528/354 |
| 5,180,765 A | 1/1993 | Sinclair | 524/306 |
| 5,216,050 A | 6/1993 | Sinclair | 524/108 |
| 5,247,059 A | 9/1993 | Gruber et al. | 526/68 |
| 5,252,642 A | 10/1993 | Sinclair et al. | 524/320 |
| 5,274,073 A | 12/1993 | Gruber et al. | 526/68 |
| 5,319,038 A | 6/1994 | Tune | 525/415 |
| 5,338,822 A | 8/1994 | Gruber et al. | 428/486 |
| 5,359,026 A | 10/1994 | Gruber | 528/354 |
| 5,382,617 A | 1/1995 | Kelly, Jr. et al. | 324/405 |
| 5,386,004 A | 1/1995 | Obuchi et al. | 528/354 |
| 5,424,346 A | 6/1995 | Sinclair | 524/108 |
| 5,444,113 A | 8/1995 | Sinclair et al. | 524/306 |
| 5,475,080 A | 12/1995 | Gruber et al. | 428/480 |
| 5,484,881 A | 1/1996 | Gruber et al. | 528/354 |
| 5,496,923 A | 3/1996 | Suizu et al. | 528/501 |
| 5,502,158 A | 3/1996 | Sinclair et al. | 528/354 |
| 5,525,706 A | 6/1996 | Gruber et al. | 528/354 |
| 5,536,807 A | 7/1996 | Gruber et al. | 528/354 |
| 5,594,095 A | 1/1997 | Gruber et al. | 528/354 |
| 5,616,783 A | 4/1997 | Yoshida et al. | 528/495 |
| 5,679,767 A | 10/1997 | Suizu et al. | 528/490 |
| 5,686,540 A | 11/1997 | Kakizawa | 525/444 |
| 5,688,530 A | 11/1997 | Bodmer et al. | 424/301 |
| 5,714,573 A | 2/1998 | Randall et al. | 528/354 |
| 5,726,220 A | 3/1998 | Tokushige et al. | 523/125 |
| 5,760,119 A | 6/1998 | Rafler et al. | 524/324 |
| 5,770,682 A | 6/1998 | Ohara et al. | 528/357 |
| 5,844,066 A | 12/1998 | Kakizawa | 528/354 |
| 6,114,495 A | * 9/2000 | Kolstad et al. | 528/354 |

FOREIGN PATENT DOCUMENTS

| | | |
|---|---|---|
| DE | 195 37 365 C1 | 12/1996 |
| EP | 0 591 978 A2 | 4/1994 |
| EP | 0 765 913 A1 | 4/1997 |
| JP | 68002949 | 12/1968 |
| JP | 68003017 | 12/1968 |
| JP | 68008614 | 12/1968 |
| JP | 6256492 | 9/1994 |
| JP | 8-333507 | 12/1996 |
| JP | 9003150 A | 1/1997 |
| JP | 9067511 A | 3/1997 |
| JP | 9077863 | 3/1997 |
| JP | 9095605 A | 4/1997 |
| JP | 9095606 A | 4/1997 |
| JP | 9110967 A | 4/1997 |
| WO | WO 90/01521 | 2/1990 |
| WO | WO 92/04413 | 3/1992 |
| WO | WO 94/06856 | 3/1994 |
| WO | WO 95/18169 | 7/1995 |
| WO | WO 97/11845 | 4/1997 |
| WO | WO 98/29493 | 7/1998 |

OTHER PUBLICATIONS

Cam, D. et al., "Influence of residual monomers and metals on poly (L–lactide) thermal stability", *Polymer* 38(8):1879–1884 (1997).

Müller, H., "Chapter 2—Metal Deactivators," *Plastic Additives Handbook,* 3rd Edition, cover pages and pp. 105–128, Copyright© Carl Hanser Verlag Mühchen Wien (1990).

Södergård, A. et al., "Changes in peroxide melt–modified poly(L–lactide)", *Ind. Eng. Chem. Res.* 34:1203–1207 (1995).

Södergård, A., "Chemical and morphological changes in peroxide–stabilized poly(L–lactide)", Chapter 9, *Hydrogels and Biodegradable Polymers for Bioapplications,* Ottenbrite et al., Eds., from symposium sponsored by the Division of Polymer Chemistry, Inc., at the 208th National Meeting of the American Chemical Society, Washington, D.C., Aug. 21–26, 1994; pp. 103–117.

(List continued on next page.)

*Primary Examiner*—P. Hampton-Hightower
(74) *Attorney, Agent, or Firm*—Merchant & Gould P.C.

(57) ABSTRACT

The invention relates to a lactic acid residue containing polymer composition and product having improved stability and to methods for the preparation and use thereof. The lactic acid residue containing polymer preferably includes a polylactide polymer having a number average molecular weight of between about 25,000 and about 200,000, lactide, if present at all, present in a concentration of less than 0.5 wt % based on the weight of the composition, and deactivating agents. Articles which can be manufactured from the lactic acid residue containing polymer composition include fibers, coated paper, films, moldings, and foam.

25 Claims, 4 Drawing Sheets

OTHER PUBLICATIONS

Södergård, A., "A stability study of poly(L–lactide) in the melt", *Annual Translations of the Nordic Rheology Society,* 3:6–8 (1995).

Södergård, A. et al., "Stabilization of poly(L–lactide) in the melt" (source publication illegible), ©1994 Elsevier Science Limited, #0141–3910/94; pp. 25–30

Södergård, A. et al., "A XPS study of the catalytic tin in poly(L–lactide)", *Polymer Reprints* 37(1):685–686 (1996).

Wachsen, O. et al., "Thermal degradation of poly–L–lactide—studies on kinetics, modelling and melt stabilisation", *Polymer Degradation and Stability* 57:87–94 (1997).

Witzke, D. et al., "Reversible kinetics and thermodynamics of the homopolymerization of L–lactide with 2–ethylhexanoic acid tin(II) salt", *Macromolecules* 30:7075–7085 (1997).

\* cited by examiner

LACTIC ACID RESIDUE CONTAINING POLYMER COMPOSITION AND PRODUCT HAVING IMPROVED STABILITY, AND METHOD FOR PREPARATION AND USE THEREOF

This application is a continuation of application Ser. No. 09/053,836, filed Apr. 1, 1998 now U.S. Pat. No. 6,114,495, U.S. application Ser. No. 09/053,836 is incorporated herein by reference.

FIELD OF THE INVENTION

The invention relates to a lactic acid residue containing polymer composition and product having improved stability and to method for the preparation and use thereof. In particular, the invention relates to the use of multifunctional carboxylic acid for stabilizing lactic acid residue containing polymers.

BACKGROUND OF THE INVENTION

In recent years, attention has focused on preferred degradable polymers which can be converted to desired substrates or articles. Much of this attention is focused on polymers which include, as monomeric units therein, the result of lactic acid or lactide polymerization. Attention is directed, for example, to U.S. Pat. No. 5,142,023 to Gruber et al.; U.S. Pat. No. 5,338,822 to Gruber et al.; U.S. Pat. No. 5,475,080 to Gruber et al.; U.S. Pat. No. 5,359,026 to Gruber; and U.S. Pat. No. 5,594,095 to Gruber et al. the complete disclosures of which are incorporated herein by reference. It is noted that U.S. Pat. Nos. 5,142,023; 5,338,822; 5,475,080; 5,359,026; and 5,594,095 are owned by Cargill Incorporated, of Minneapolis, Minn. Cargill Incorporated is the assignee of the present application as well.

Other published documents which concern polymers of lactic acid or lactide include: International Publication No. WO 94/06856 to Sinclair et al., published Mar. 31, 1994; International Publication No. WO 92/04413 to Sinclair et al., published Mar. 19, 1992; and International Publication No. WO 90/01521 to Sinclair et al., published Feb. 22, 1990.

It has been reported that lactic acid residue containing polymers, if not treated, are too unstable for processing at high temperatures. See U.S. Pat. No. 5,338,822 to Gruber et al.

There exist three conventional techniques for forming linear polyesters. These techniques include the condensation reaction of a diacid with a diol; the condensation reaction of an hydroxy-acid and/or ester; and the ring opening polymerization of a cyclic ester. Although the polymer resulting from each technique contains the characteristic ester linkage, the structure of the polymer can be different. In the technique involving the condensation reaction of a diacid with a diol, the repeat unit will have a head-tail-tail-head configuration as shown by the general formula: $[(CR_2)_x-O-CO-(CR'_2)_y-CO-O-]$. In contrast, the techniques involving the condensation of an hydroxy acid and/or ester and the ring opening polymerization of a cyclic ester provide a polymer having a simpler repeat formula and a head-tail-head-tail structure as shown by the general formula: $-[(CR''_2)_y-CO-O]-$. This difference is similar to the difference between Nylon 6,6 and Nylon 6.

Polyesters produced by condensation reaction of an hydroxy-acid and/or ester and/or by the ring opening polymerization of a cyclic ester may be depolymerized by an "unzipping" or depolymerization reaction. An exemplary depolymerization reaction is demonstrated by the reverse arrow in the equilibrium reaction for polylactide shown below.

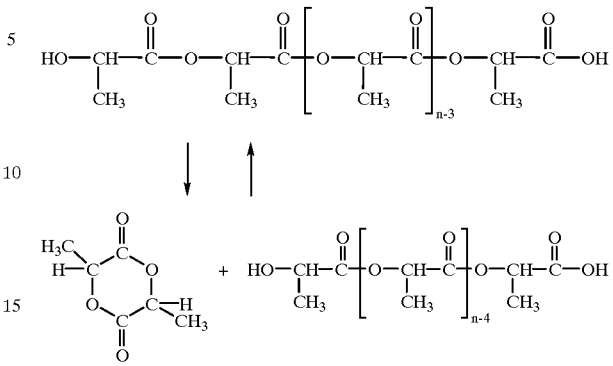

The possibility exists for copolymers where each of the monomer units can be drawn in a cyclic form. In the case of a polymer formed by polymerizing lactic acid, the depolymerization reaction can lead to the formation of lactide, a cyclic ester (diester).

The formation of lactide by depolymerization during melt processing is undesirable. At a certain level, the formation of lactide can cause a change in the physical properties of the molten polylactide polymer such as reducing the polymer melt viscosity and melt elasticity. In addition, the lactide is volatile and can result in fuming and/or fouling of the processing equipment. Furthermore, depolymerized lactide in the final product is likely to cause decreased shelf life. Lactide is generally more susceptible to hydrolysis, leading to acidity in the final product which can catalyze polymer hydrolysis. In certain applications, high lactide levels may raise concerns about migration into foodstuffs.

The tendency to form lactide is also a potential source of difficulty in preparing a polylactide composition with a low residual lactide level. Residual lactide can be removed at elevated temperatures under vacuum. However, the tendency to form additional lactide will be a competing reaction, giving a composition with a higher residual lactide level. Additional lactide may also form in the equipment and piping following the devolatilization zone. Accordingly, it is important to minimize the time the polymer is exposed to high temperature following the devolatilization zone.

The formation of the cyclic ester (lactide) can be considered the "reverse reaction." It is, in fact, the reverse reaction for the ring-opening polymerization reaction of lactide polymerization, but it can also be considered the reverse reaction in the case of lactic acid polymerization through direct condensation. The propensity to form cyclic ester by depolymerization has been found to be related to catalyst concentration and activity, and to the equilibrium of the reaction as described in U.S. Pat. No. 5,338,822 to Gruber et al. which issued on Aug. 16, 1994 and by Witzke et al., Macromolecules, 30, 7075–7085, 1997.

There exists comparatively little literature discussing the equilibrium relationships for most of the ring systems compared with non-ring systems. Lactide is one of the better known ring systems, and the equilibrium relationship between lactide and polylactide has been described in various references, including U.S. Pat. No. 5,338,822 to Gruber et al. Other ring systems have been tested to determine the general feasibility of polymerization and results reported in references such as M. H. Hartmann, *High Molecular Weight Polylactic Acid Polymers,* Chapter 15, pp. 367–411, *Biopolymers from Renewable Resources,* Kaplan, D. (ed.), Springer-Verlag, Berlin, to be published July 1998; R. D. Lundberg and E. F. Cox, *Lactones*, Chapter 6, pp. 247–302, *Kinetics and Mechanisms of Polymerization*, vol. 2, 1969; D. B. Johns, R. W. Lenz and A. Luecke, *Lactones*, Chapter 7, pp. 461–521, *Ring-Opening Polymerization*, 1984; Y. Chujo and T. Saegusa, *Ring-Opening Polymerization*, pp. 662–647, *Encyclopedia of Polymer Science and Ens.*, vol. 1, 1988, John Wiley & Sons, New York. A ring system which tends to not polymerize in the presence of catalyst under elevated temperature can be described as a stable ring system. In such a system, the equilibrium condition is far to the left in the equilibrium reaction shown above. Systems which do not polymerize are of little concern because polymer does not form. A system which polymerizes readily corresponds to a system which goes far to the right. These types of systems are generally inherently stable against depolymerization via cyclic ester formation. The systems which polymerize to a certain extent, but not completely, are of the greatest concern. This is because once they have been successfully polymerized there may exist a strong tendency to depolymerize during melt processing, forming the cyclic esters and incurring the problems described above.

Prior attempts at stabilizing polylactide polymers include end capping the polymer, removing or precipitating catalyst from the polymer, controlling the catalyst level, or deactivating the catalyst. The use of certain phosphite compounds as chain extension agents has been noted in the literature for use in polyethylene terephthalate and some other polyesters. See; for example, U.S. Pat. Nos. 4,417,031 and 4,568,720, and Aharoni et al., J. Poly. Sci. A, vol. 24, p. 1281–1296, (1986).

SUMMARY OF THE INVENTION

A lactic acid residue containing polymer composition having improved stability is provided by the present invention. By providing improved stability, it is meant that the composition provides at least one or all of lactide formation stability, molecular weight degradation stability, and color stability. Preferably, the lactic acid residue containing polymer composition includes a polylactide polymer having a number average molecular weight of between about 25,000 and about 200,000, and between about 0.01 wt % and about 2 wt % deactivating agent.

Two general classes of deactivating agent are described in this application. The first class of deactivating agent includes phosphite antioxidants. The second class of deactivating agent includes multifunctional carboxylic acids, particularly those where the acids are on carbon atoms not more than about six carbon atoms apart wherein the counted carbon atoms include the carbonyl carbon. Examples of polycarboxylic acids include dicarboxylic acids such as tartaric acid, succinic acid, malic acid, fumeric acid, and adipic acid. Another type of multifunctional carboxylic acid includes polycarboxylic acid which includes oligomers and polymers containing three or more carboxylic acid groups and a molecular weight of greater than about 500. A particularly preferred polycarboxylic acids includes polyacrylic acid.

A method for stabilizing a lactic acid residue containing polymer composition is provided by the present invention. The method includes providing a lactic acid residue containing polymer composition comprising polylactide polymer having a number average molecular weight of between about 5,000 and about 200,000, and introducing therein a catalyst deactivating agent. Preferably, the catalyst deactivating agent has a molecular weight of greater than about 500 and is provided in an amount of between about 0.01 wt % and about 2 wt % based on the weight of the lactic acid residue containing polymer composition. An advantage of providing a deactivating agent having a molecular weight of greater than about 500 is that it is less likely to devolatilize under conditions normally encountered during polylactide devolatilization. If the deactivating agent is relatively volatile under conditions of polylactide destabilization, it is generally desirable to introduce the deactivating agent after the completion of the polylactide devolatilization step, or near the end of the polylactide devolatilization step.

A method for manufacturing a lactic acid residual containing polymer composition is provided by the present invention. The method includes steps of providing a polymerization mixture including lactide, catalyst, phosphite deactivating agent, and polymerizing the polymerization mixture.

The invention additionally relates to articles which can be provided from stabilized lactic acid residue containing polymer compositions, and to methods for preparing articles from a stabilized lactic acid residue containing polymer composition. Exemplary types of articles which can be prepared include fibers and nonwovens, coated paper, films, moldings, and foam. Methods for manufacturing articles include a step of melt processing.

DETAILED DESCRIPTION OF THE INVENTION

Figure 1:
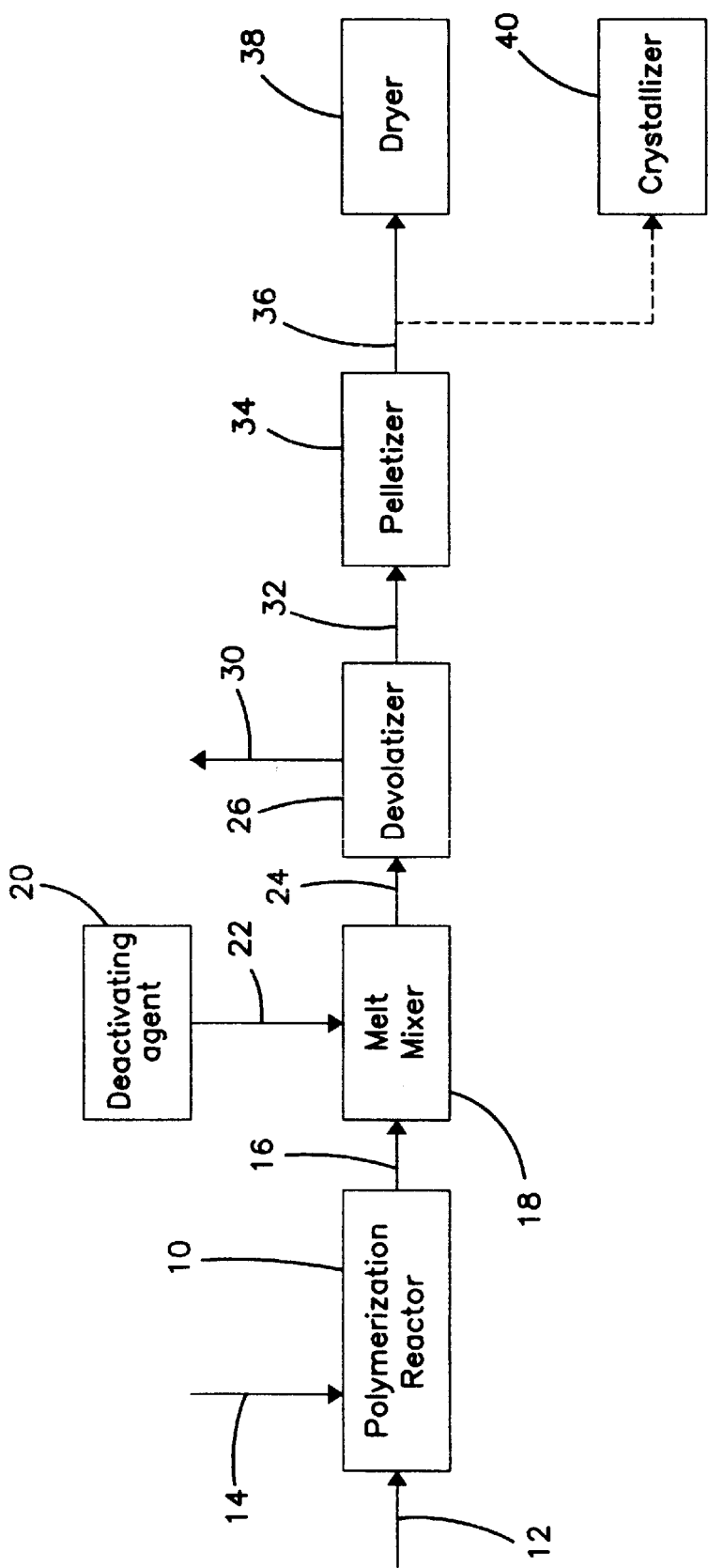
FIG. 1 is a schematic representation of a method for preparing stabilized polymer product according to principles of the present invention which involves introducing deactivating agent into polymer prior to devolatilizing the polymer.

The present invention is concerned with providing stability to polylactide polymer compositions. Generally, the concept of polylactide polymer stability can be broken down into three types or forms of stability. These three types of stability include lactide formation stability, molecular weight degradation stability, and color stability. Lactide formation stability generally refers to the resistance of the polylactide polymer composition to depolymerization to form lactide. The formation of lactide is referred to as the reverse reaction. Processing polylactide at high temperatures and for long times tends to favor the formation of lactide in the molten polymer. The formation of lactide is a problem because the lactide may flash out of the polymer during processing, causing fumes and fouling equipment. In addition, the presence of large amounts of lactide in the final product can adversely affect physical properties and storage life. Molecular weight degradation stability generally refers to the resistance of the polylactide polymer composition to large decreases in molecular weight. Molecular weight degradation is often characterized by chain scission. A reduction in molecular weight during processing is a problem for polylactide polymers because of its effect on viscosity and physical properties, such as, tensile strength, yield, impact resistance, etc. It is important to control and/or maintain molecular weight in order to maintain quality. Color stability generally refers to the resistance of the polylactide polymer composition to yellowing. Polylactide polymer compositions are prone to developing a yellow/brown color upon prolonged exposure to heat. This coloring may be due to the presence of impurities. This is undesirable for many applications, particularly where water-white color is desirable.

The polylactide polymer composition of the invention can be used in those applications where maintaining any one or more of the above-described types of stability is a desirable feature. Exemplary applications include extrusion for the production of fibers, nonwovens, wovens, films, and coated articles or multilayered structures such as coated paper and bags, injection molding, and foamed articles.

I. Polymer Composition

In general, preferred polymer compositions which can be provided according to the present invention include, as at least one component, polylactide or polylactic acid (polylactide and polylactic acid being referred to, collectively, herein as polylactide or PLA). Accordingly, the invention concerns enhancing the stability of polylactide.

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to polymers of polylactic acid or polylactide, as well as copolymers of lactic acid or lactide, wherein the resulting polymer comprises at least 50%, by weight, lactic acid residue repeating units or lactide residue repeating units. In this context, the term "lactic acid residue repeating unit" is meant to refer to the following unit:

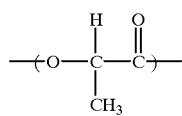

In view of the above definition, it should be clear that polylactide can be referred to both as a lactic acid residue containing polymer and as a lactide residue containing polymer. Herein the term "lactide residue repeating unit" is meant to refer to the following repeating unit:

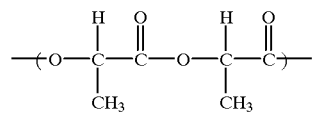

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

It should be understood that the phrases "PLA polymer" and "polylactide polymer" are not intended to limit the polymer to one containing only lactide residues and/or lactic acid residues, unless specifically identified as such. As used herein, the phrases "PLA polymer" and "polylactide polymer" cover polymers containing the above-described lactic acid residue repeating unit in an amount of at least 50%, by weight, based on the total repeating units in the polymer. Furthermore, the phrases "PLA composition" and "polylactide composition" are not intended to limit the polymer composition to one containing only polylactide or polylactic acid as the polymer component, unless specifically identified as such. The composition can include other polymers or components blended in with the polymer containing at least 50%, by weight, lactic acid residue repeating units. In most applications, it is believed that the polylactide component of the composition will be the dominant polymer component, but that is not a requirement. It should be appreciated that the invention relates to stabilizing polylactide polymer whether it is a major or minor component in the composition. Generally, it is expected that at least about 20% of the composition will be comprised of a polylactide material. Preferably, the composition will include at least about 70% by weight polylactide, and more preferably at least about 90% by weight polylactide. It should be appreciated that the amount of polylactide present in a particular composition depends on the desired property to be imparted to that composition. In certain compositions, 100% by weight of the polymer component of the composition can be polylactide.

A. PLA (Polylactic Acid or Polylactide)

PLA-based polymer compositions according to the present invention are generally prepared from polymerization of lactide or lactic acid. In some applications, the polymerization may be a copolymerization, with the lactide or lactic acid monomer copolymerized with another material. In some instances, the lactic acid or lactide may first be polymerized, with the resulting polymer mixture then being reacted, for example copolymerized, with another material in order to provide for some desired modification, for example relating to ductility, impact resistance, molecular weight or polydispersity.

It has become increasingly important to provide polymers derived from renewable resources. This will become particularly important as petroleum reserves decrease in the future driving up the cost of petroleum based polymers. In addition, it is becoming increasingly important to provide polymers which are prepared by processes which are increasingly environmentally friendly. U.S. Pat. No. 5,510,526 to Baniel et al. describe the recovery of lactic acid from a fermentation broth. The lactic acid, once recovered, can be processed according to U.S. Pat. No. 5,142,023 to Gruber et al. in order to provide polylactide polymer. The disclosures of these patents relating to lactic acid recovery, polymerization of lactic acid, depolymerization and purification to provide lactide, and polymerization of lactide, as described by U.S. Pat. Nos. 5,510,526; and 5,142,023; and 5,338,822, and U.S. patent application Ser. Nos. 08/862,612 and 08/850,319, are incorporated herein by reference.

The polylactide polymer is particularly advantageous because it can be provided from renewable resources and can be composted relatively quickly so that its biomass can be reintroduced into the environment. Polylactide polymer can be considered, therefore, a relatively benign polymer in terms of overall impact on the environment.

Applicants have found that the acid concentration in a polylactide polymer composition generally influences the rate of hydrolysis. The impact of increased acid concentrations is believed to promote more rapid degradation by hydrolysis. Accordingly, it can be important to minimize the concentration of acid residuals (including acid and residual lactide concentrations) in order to resist hydrolysis thereby extending shelf life. Applicants believe that adding a certain type and amount of carboxylic acid to the polylactide composition allows one to provide a polylactide composition having lower levels of lactide compared with compositions not provided with the small amount of carboxylic acid. It is expected that this provides increased resistance to hydrolysis. Conversely, increasing acid concentration is expected to increase the rate of hydrolysis thereby increasing the rate of degradation.

B. Copolymers

Lactic acid residue containing polymer compositions include copolymers and are generally prepared from monomers which include lactic acid or lactide. Polymers which are considered lactic acid residue containing polymers include poly(lactide) polymers, poly(lactic acid) polymers, and copolymers such as random and/or block copolymers of D-, L-, or meso-lactide and/or R- or S-lactic acid. A particularly preferred copolymer includes residues of both L-lactide residue and meso-lactide residue as repeating units.

Particularly preferred viscosity modified polylactide polymers include copolymers of lactide and multifunctional epoxides. Particularly preferred are epoxidized linseed oil and epoxidized soybean oil. In many situations, it is preferred that the polymer is prepared from 0.1 to 0.5 weight percent epoxidized multifunctional oil and molten lactide monomer.

It should be understood that while many different types of components or reactants can be introduced into the polylactide polymer, the presence thereof does not necessarily make them repeating units. Clearly, the presence of a component or residue thereof at a concentration which corresponds to the presence of a few components or residues in a polymer chain is not repeating.

Other preferred copolymers include copolymers of PLA with other biodegradable polymers, especially aliphatic polyesters. One preferred method to form the copolymers would be through interesterification or coupling in a post polymerization process, such as reactive extrusion. This method might include techniques such as extruding in the presence of a chain coupling agent including, for example, TPP and/or TNPP as described in more detail below, or crosslinking with an agent such as peroxide as disclosed in U.S. Pat. Nos. 5,359,026 and 5,594,095 by Gruber et al., the entire patents being incorporated herein by reference. Alternatively, copolymers of lactide and other cyclic esters, cyclic-ethers, and cyclic ester-amides are possible. Comonomers in this case would include a lactide with glycolide, paradioxanone, morpholinedinones, dioxepane-2-one, dioxanones (such as p-dioxanone), lactones (such as epsilon-caprolactone or 4-valerolactone), dioxan (dione)s (such as glycolide or tetramethyl- 1,4-dioxane-2,5-dione), or esteramides (such as morpholine-2-5-dione). Also, copolymers of lactic acid and other hydroxy acids or hydroxy and/or acid terminated low molecular weight polyesters are possible. Aliphatic polyesters or polyester-amides are preferred.

C. Blends

As discussed above, many different types of polymers can be blended with polylactide and used in the present invention. Exemplary types of polymers which can be blended with polylactide or used as separate components in a multicomponent fiber include polyolefins, polyamides, aromatic/aliphatic polyesters, including polybutylene terephthalate and polyethylene terephthalate, and combinations thereof. Additional types of polymers which can be used include destructurized starch compositions, polyhydric alcohols and derivatives, hydroxypropyl cellulose derivatives, cellulose esters, biodegradable aliphatic polyesters, ethers, urethanes, and biodegradable aliphatic-aromatic polyesters. Examples of destructurized starch compositions include starch in combination with ethylenevinyl alcohol (EVOH) available as "Mater-Bi" from Novamont. Exemplary polyhydric alcohols and derivatives include polyvinyl alcohol modified with appropriate plasticizers, such as, glycerol, ethylene glycol, polyvinyl alcohol in combination with poly(alkeneoxy) acrylate which is available as "Vinex" from Air Products and Chemicals. An exemplary hydroxypropyl cellulose derivative includes hydroxypropyl cellulose non-ionic cellulose ether, such as that available as "KLUCEL" from Hercules. Exemplary cellulose esters include cellulose acetates ("Tenites" available from Eastman and including proprionates and butyrates), cellulose acetate proprionates, and cellulose acetate butyrates. Exemplary biodegradable aliphatic polyesters include polyhydroxy butyrate (PHP), polyhydroxy butyrate-co-valerate (PHBV) available as "Biopol" and polycaprolactane available as "Tone" from Union Carbide, polybutylene succinate available as "Bionelle" 1000 series by Showa, polybutylene succinate-co-adipate available as Bionelle 3000 by Showa, polyglycolic acid (PGA), various grades of polylactide (PLA), polybutylene oxalate, polyethylene adipate, polyparadioxanone, polymorpholineviones, and polydioxipane-2-one. Exemplary ethers include polypropylene oxide and copolymers of polypropylene oxide and polyethylene oxide and copolymers of polyethylene oxide. Exemplary polycarbonates include polyethylene carbonate, polybutylene carbonate, and polytrimethylene carbonate and its derivatives. Exemplary urethanes include urethanes made with polyester or ethers or mixtures thereof, or made from polyesters and urethanes to provide aliphatic polyester urethanes. Biodegradable aliphatic-aromatic polyesters include polybutylene succinate-co-terephthalate available from Eastman, and "Biomax" available from Dupont.

Additional components which can be either blended with the PLA or utilized as another component of a multicomponent film include thermoplastic resins, such as, hydrocarbons, polyesters, polyvinyl alcohols, poly (acrylonitrile) polymers, and select highly substituted cellulose esters. Exemplary hydrocarbons include polyethylene, polypropylene. Exemplary polyesters include aromatic polyesters, such as, polyethylene terephthalate (PET) and polybutylene terephthalate (PBT).

Preferred polymers which can be blended include natural rubber, synthetic rubbers, and epoxidized natural rubbers, as described in U.S. Pat. No. 5,714,573 which issued on Feb. 3, 1998, the entire disclosure of which is incorporated herein by reference.

II. Techniques For Stabilizing The Polymer Composition

Now with reference to FIGS. 1–4, various schematic representations are provided for stabilizing polymer product. In FIG. 1, a polymerization reactor 10 is provided which receives lactide from lactide feedline 12 and catalyst from catalyst feed line 14. In a preferred process, the polylactide is polymerized at a temperature of at least about 160° C. with a sufficient amount of catalyst and for a sufficient length of time to reach a conversion of at least about 85%. The polymerization reactor is preferably a plug flow reactor with recycle capability, or a series of plug flow reactors with recycle capability, although continuous stirred tank reactors in series are also suitable. In a preferred embodiment, the catalyst is provided in an amount ranging from about 0.09 to about 1.39 meq/kg and more preferably between about 0.17 and about 0.69 meq/kg. Preferably, the length of polymerization is between about 0.5 and 14 hours and more preferably between about 1.5 and 7 hours.

Polylactide polymer leaves the polymerization reactor 10 as a melt via line 16 and flows into the melt mixer 18 which is provided for working the deactivating agent 20 from deactivating inlet 22 into melted polymer. The melt mixer can be any apparatus which adequately works the deactivating agent into the melted polymer. Exemplary types of melt mixers include extruders, static mixers, and pumps. Preferably, the deactivating agent is added in an amount of between about 0.001% to 0.5% by weight, and more preferably 0.01% and 0.2% by weight based on the total weight of the polymer composition.

In the context of the present invention, the reference to a deactivating agent is meant to refer to an agent which deactivates the catalyst and can be referred to as a catalyst deactivating agent. It should be appreciated that this action of the catalyst deactivating is a theory believed by the Applicants to describe how the deactivating agent provides increased stability for the polylactide polymer composition. Applicants do not intend to be bound by this theory, and it should be appreciated that it is the stabilizing effect of the deactivating agent which is important. Accordingly, the deactivating agent can also be referred to as a stabilizing agent because of its stabilizing effect on the polylactide polymer composition.

The combination of melted polymer and deactivating agent leaves the melt mixer 18 by line 24 and enters the devolatilizer 26. The purpose of the devolatilizer 26 is to remove residual lactide and any other volatile impurities. Accordingly, the devolatilizer is preferably maintained at a temperature of between about 200° C. and about 260° C., and a pressure of less than about 10 mm Hg, more preferably less than about 5 mm Hg, and most preferably less than 2 mm Hg, absolute pressure. Lactide is removed from the devolatilizer 26 as a vapor via volatile removal line 30. Exemplary types of devolatilizers include extruders, especially twin screw extruders, wiped film evaporators, falling strand evaporators, rotary devolatilizers, rotary disk devolatilizers, centrifugal devolatilizers, and flat plate devolatilizers.

The combination polymer and deactivating agent leaves the devolatilizer 26 via line 32 as a melt, and enters the pelletizer 34. It is in the pelletizer 34 that the polymer composition is quenched and pelletized to provide a flowable solid. Preferably, the pelletizer includes a die-face cutting pelletizer. Such a pelletizer generally includes a cooling medium, a plurality of extrusion holes, and a rotating face cutter. A strand cutting pelletizer is also suitable.

Pelletized polymer 36 is then either forwarded to a dryer 38 to remove moisture, or it is forwarded to a crystallizer 40. It should be understood-that both the dryer and the crystallizer are optional and, if further drying or crystallizing is not desired, these apparatus can be omitted. Conventional crystallizers can be used and are available from Unidyne, Conair Group, Gala, Novatech Inc., Witte Company Inc., and Hosokowa-Bepex Corporation.

Applicants discovered that when the deactivating agent is added prior to devolatilization, the deactivating agent should be sufficiently nonvolatile under the conditions of operation in the devolatilizer 26 that the deactivating agent remains with the polymer during the devolatilization process. In the case where the deactivating agent is relatively volatile under the conditions of devolatilization, it may be desirable to add the deactivating agent subsequent to devolatilization.

Figure 2:
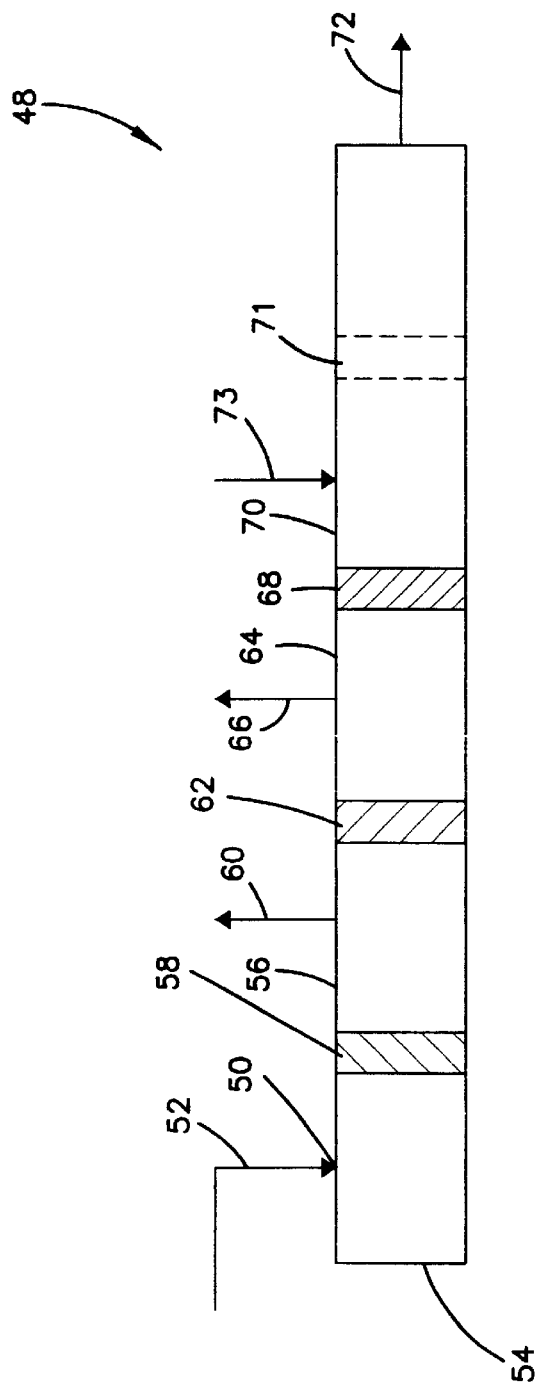
FIG. 2 is a schematic representation of a method for preparing stabilized polymer product according to principles of the present invention which involves introducing deactivating agent into polymer after devolatilizing the polymer.
Figure 4:
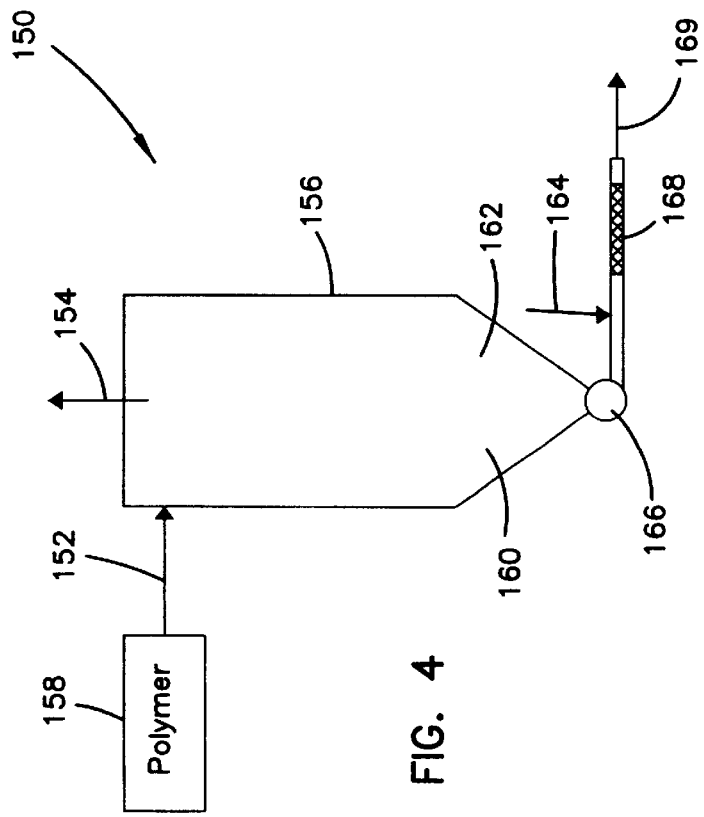
FIG. 4 is a schematic representation of a wiped film evaporator for devolatilizing polymer according to principles of the present invention.

In the situation where the deactivating agent is relatively volatile or at least partially volatile during the devolatilization process, the deactivating agent is preferably added at the end of the devolatilization process, or after the devolatilization process. FIGS. 2 and 4 depict embodiments of the invention where the deactivating agent is added after the steps of devolatilizing. It should be appreciated that deactivating agent can be added prior to completion of the devolatilizing process, but it should be expected that at least a part of the volatile deactivating agent will volatilize out during the devolatilization process.

Now referring to FIG. 2, a more detailed schematic of the devolatilizer 48 is shown for the addition of a relatively volatile deactivating agent. In a preferred embodiment, the devolatilizer 48 includes an inlet 50 for receiving a composition including molten polymer containing residual lactide via the feed line 52. The inlet 50 is provided within the feed section 54 of the devolatilizer 48. The feed section 54 is separated from the vacuum port 56 by a melt seal element 58. While the molten polymer containing residual lactide is provided within the vacuum port section 56, lactide vaporizes under reduced pressure and elevated temperature and is removed via the lactide draw 60. The molten composition then passes beyond melt seal element 62 into the vacuum port section 64. The composition is again subjected to elevated temperature and reduced pressure, and lactide vaporizes and is removed via the lactide draw 66. The molten composition then flows beyond the melt seal element 68 and into the final mixing stage 70. It is in this mixing stage 70 that deactivating agent can be added via line 73 and mixed into the molten polymer by virtue of the mixing element 71. The composition is then removed from the devolatilizer via line 72 and continues for further processing which may include pelletizing as discussed above.

It should be appreciated that while the invention is described in the context of a devolatilizer 48 having two vacuum port sections, the desired number of vacuum port sections and the residence time within each is a function of the level of lactide provided within the molten composition and the level of lactide desired in the polymer product. Thus, the devolatilizer can be provided with one or more vacuum port sections, as desired.

Figure 3:
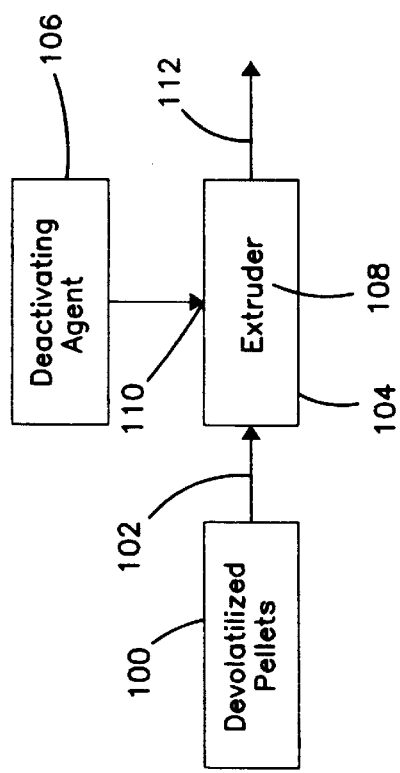
FIG. 3 is a schematic representation of a method for preparing stabilized polymer product according to principles of the present invention which includes introducing deactivating agent into a polymer in a secondary compounding apparatus.

Now referring to FIG. 3 which shows a schematic representation of a method for preparing stabilized polymer product which includes introducing a deactivating agent into a secondary compounding apparatus. Devolatilized polymer pellets 100 are introduced via line 102 into an extruder 104. The polymer pellets are melted within the extruder 104 to provide a melted polymer composition 108, and deactivating agent 106 is added to the melted polymer composition 108 through the deactivating agent inlet 110. The resulting composition can be referred to as the stabilized composition including polymer and deactivating agent, and can be processed into articles or pellets. Exemplary type articles include moldings, coatings, fibers, foams, and films.

The extruder 104 is preferably a vented twin screw extruder with at least one set of mixing elements. It is preferred that the deactivating agent is added to the polymer after it is completely molten. This facilitates introduction of the deactivating agent into the polymer.

Now referring to FIG. 4, a schematic of a preferred devolatilizer is provided at reference numeral 150. The devolatilizer 150 can be referred to as a wiped film evaporator and includes a polymer inlet 152 and a lactide draw 154. Melted polymer 158 entering the wiped film evaporator is spread along the heated interior walls 156. In general, the conditions within the wiped film evaporator 150 are preferably provided at a temperature of between about 200° C. and 260° C., and at a pressure of between about 0.5 mm Hg and about 5 mm Hg. Under such conditions, the residual lactide within the melted polymer vaporizes and is removed through the lactide draw 154. Applicants have found that the wiped film evaporator 154 advantageously increases the surface area of the polymer compared with conventional devolatilizers such as extruder-type devolatilizers. Furthermore, the wiped film evaporator 150 provides agitation of the melted polymer film which enhances mixing and increases the rate of removal of the residual lactide from the melted polymer.

In a preferred embodiment, the devolatilizer 150 is used as the devolatilizer 26 in the process depicted in FIG. 1. In this situation, the deactivating agent is added to the melted polymer in a static mixer. Alternatively, the deactivating agent can be added after the step of devolatilizing as shown in FIG. 4.

The devolatilized and melted polymer 160 collects in the collection zone 162 of the wiped film evaporator 150. Deactivating agent can be added to the molten and devolatilized polymer 160 as it is removed from the wiped film evaporator 150 via melt pump or gear pump 166. Once the deactivating agent 164 is introduced into the molten and devolatilized polymer 160, the composition is preferably subjected to mixing in a mixer element 168. The mixed composition can then be processed through a pelletizer. Of course, the mixer element 168 can be omitted if the deactivating agent is mixed into the polymer prior to devolatilizing.

It is pointed out that devolatilized polymer, prior to pelletizering, can be considered sufficiently dry as a result of the devolatilizing step. Thus, by utilizing a pelletizer system which avoids water contacting the polymer composition, it is possible to provide dry pellets and avoid the need for providing a drier subsequent to pelletizing.

In a preferred embodiment, the deactivating agent is added to the polymer in an amount ranging from about 0.001% by weight to about 0.5% by weight, and more preferably 0.01 to about 0.2% by weight based on the total weight of the polymer composition.

The devolatilized polymer which has been pelletized can either be stored for subsequent use or fed directly to a compound/finisher for producing stabilized product based upon polylactide polymer.

For certain deactivating agents, such as the phosphite antioxidants, the applicants have found beneficial effect by adding the phosphite antioxidant to the polymerization mixture. The phosphite antioxidant can be added to the lactide monomer mixture prior to the polymerization or to the polymerized mixture at any time during polymerization. The phosphite helps prevent molecular weight decline and browning reactions during the polymerization. Subsequently, the phosphite can also serve as a deactivating agent to reduce the rate of lactide formation. Applicants believe that exposure to moisture, such as in an underwater pelletizer, may modify the phosphite to provide the deactivation function. Applicants speculate that exposure to moisture might also be carried out, for example, by addition of steam to a devolatilizing extruder in order to deactivate the catalyst following polymerization but prior to, or simultaneous with, devolatilization.

It should be understood that another technique for removing lactide from polylactide polymer involves "solid stating." Often people confuse devolatilizing with solid stating. In general, solid stating refers to the reduction of lactide level by promoting the forward reaction of lactide to polylactide. The process of solid stating of polylactide can include conditions of about 100° C. to about 130° C., for times of about 1 day to about a week. Crystallization of the polymer during solid stating can aid in reducing lactide level. Witzke, Ph.D. Dissertation, Michigan State University, 1997. The Applicants have found that devolatilizing polylactide to remove lactide is commercially more advantageous than the solid stating process.

A. Lactide Reformation Stability

1. Deactivating Agent

Applicants have found that the lactide reformation reaction (the reverse reaction) can be effectively slowed at high temperatures in polylactide polymers by introducing appropriate agents which can be referred to as deactivating agents or deactivators. It is believed that such agents may act by deactivating the catalyst and thereby essentially removing the effectiveness of the catalyst for the reverse reaction. Applicants have found these deactivating agents can be particularly effective in tin catalyzed polylactide polymer compositions, especially those in which the tin is in the +2 oxidation state. That is, it is believed that these deactivating agents are particularly effective in deactivating tin catalysts, or in stabilizing polylactide compositions which have been polymerized using a tin catalyst. It is expected the deactivating agents will be effective in stopping tin catalyzed degradation reactions in other types of polymer systems.

Applicants have identified several types of deactivators. One class of deactivator includes phosphite antioxidants. A second class of deactivator includes multifunctional carboxylic acids, particularly those where the acid groups are on carbon atoms not more than about six carbon atoms apart (inclusive of the carbonyl carbon), and preferably two to five carbon atoms apart. This second class can be generalized to include compounds which contain electronegative groups which are preferably about four to seven atoms apart (inclusive of the electronegative atom). Salts and esters of multifunctional carboxylic acids and ketone structures could also be included. The carboxylic acids such as tartaric acid are preferred because of regulatory status and use as food ingredients. The carboxylic acids such as polyacrylic acid are preferred because of their nonvolatility under conditions of high temperature and low pressure associated with lactide devolatilization. Applicants have found the acid structures to be particularly effective.

(a) Phosphite Antioxidants

As shown by Example 1, phosphite antioxidants have been found to provide excellent stabilization against lactide formation. Table 1 shows the results obtained using trinononyl phenyl phosphite (TNPP), triphenyl phosphite (TPP), and distearyl pentaerythritol diphosphite (Weston 618) as deactivating agents. Each of these compounds was found to significantly reduce the lactide reformation rate. These, and other phosphite antioxidants as disclosed in U.S. Pat. No. 5,338,822 to Gruber et al. at column 13, lines 15–25, have been found to provide protection against lactide reformation. These phosphite antioxidants include trialkyl phosphites, mixed alkyllaryl phosphites, alkylated aryl phosphites, sterically hindered aryl phosphites, aliphatic spirocyclic phosphites, sterically hindered phenyl spirocyclics, and sterically hindered bisphosphonites.

The result is surprising because Applicants believe the phosphite antioxidants to be functioning as catalyst deactivating agents, yet they can be added at the start of the polymerization to prevent color formation and molecular weight degradation, without apparently affecting catalyst activity. Applicants theorize that exposure to moisture, during and following the polymerization, modifies the phosphites to provide an agent which effectively stops lactide reformation.

The phosphite antioxidants are desirably used at a concentration which provides the desired degree of stability, and avoid using too much which may be wasteful. It is expected that the amount of phosphite antioxidant will be a function of the on catalyst level. At greater catalyst level, more phosphite anioxidant may be desired. This generally corresponds with a concentration of greater than about 0.1 weight percent, and a concentration of less than about 2 weight percent. Preferably, the concentration of phosphite antioxidant is provided within a range of about 0.2 weight percent to about 1 weight percent, and more preferably between about 0.25 weight percent and about 0.5 weight percent.

(b) Dicarboxylic acids

Another category of materials which have been found to be surprisingly effective at reducing depolymerization include dicarboxylic acids. As shown by Examples 1, 2, and 9, tartaric acid, succinic acid, adipic acid, fumaric acid, malic acid, and Sylvatac 140 (a rosin with high levels of acid dimer) were effective at 260° C. in slowing lactide reformation. The most effective of the dicarboxylic acids was tartaric acid, which is also a dihydroxy acid. Tartaric acid, succinic acid, malic acid, and fumaric acid have acid groups which are four carbon atoms apart (inclusive of the carbonyl carbon). Adipic acid has acid groups which are six carbons apart (inclusive of the carbonyl carbon).

The superior performance of the dicarboxylic acids is surprising in view of the poor performance of the monocarboxylic acids. Lactic acid, lactyl lactyllate (DP2), alginic acid, stearic acid, and aspartic acid were all tested and found to be poor at preventing lactide reformation at 260° C. It is observed that the lactic acid and DP2 are both hydroxy acids, that alginic and stearic acids are simply carboxylic acids, and aspartic acid is an amino acid.

The dicarboxylic acids, exemplified by tartaric acid, were found to be effective at levels as low as 0.026 wt %, and are likely to be effective at higher amounts. Applicants believe that amounts up to 1 wt % or more could be used with little adverse effect in the melt, although shelf life may decrease due to the increased acid content. For applications where rapid degradation is desirable this may be an advantage.

It is expected that the preferred ranges of dicarboxylic acid for providing desired stabilization will be dependent on catalyst level. At greater catalyst level, more dicarboxylic acid may be desired. At the preferred catalyst levels identified above, the amount of dicarboxylic acid is preferably provided in an amount of at least about 0.01 weight percent, and in an amount of less than about 2 weight percent. Preferably, the amount of dicarboxylic acid is provided in an amount within the range of about 0.02 weight percent and about 1 weight percent, and more preferably within a range of about 0.04 weight percent and about 0.3 weight percent based on the total polymer composition weight.

An ester of tartaric acid, diethyl L-tartarate, was tested and found to be ineffective at reducing lactide formation. Salts of tartaric acid were additionally tested and it was found that they appear to reduce lactide formation but apparently cause molecular weight degradation.

A test was conducted to compare optical isomers of tartaric acid. Surprisingly, when tested in a polylactide sample (primarily L-lactide residues) it was found that D-tartaric acid was more effective at preventing lactide formation than was L-tartaric acid. It is expected that meso tartaric acid is effective at preventing lactide reformation.

Applicants have found that under conditions of lactide devolatilization, tartaric acid tends to volatilize from the polymer composition. Accordingly, if tartaric acid is added to polylactide polymer as a deactivating agent, it is preferably added after the devolatilization step. While tartaric acid is generally considered nonvolatile, Applicants have found that it is sufficiently volatile under the conditions encountered during the devolatilization of polylactide such that at least a portion of the tartaric acid tends to leave the polylactide polymer. As discussed above, the process of devolatilizing. polylactide polymer generally occurs at a temperature of between about 200° C. and about 260° C. and a pressure of between about 0.5 mm Hg and about 10 mm Hg for a residence time of up to about 20 minutes. If the devolatilization occurs at lower temperature, the volatility of tartaric acid may not be an issue and it can be added prior to devolatilization.

(c) Polycarboxylic Acid

In the context of the present invention, the phrase "polycarboxylic acid" describes a carboxylic acid containing molecule having three or more carboxylic acid groups, and preferably describes oligomers and polymers containing three or more carboxylic acid groups. In general, the polycarboxylic acid has a molecular weight which is greater than about 500 to provide the desired degree of nonvolatility during the devolatilization processes encountered when devolatilizing polylactide. Preferably, the molecular weight of the polycarboxylic acid is greater than about 1,000. In order to provide the desired degree of deactivating agent or stabilizing agent activity, it is desirable for the polycarboxylic acid to include at least one carboxylic acid group per 250 a.m.u.

Applicants have found that polyacrylic acid advantageously functions well for reducing lactide formation. This effect has been observed for both high molecular weight polyacrylic acid and low molecular weight polyacrylic acid. The acid concentration for polyacrylic acid corresponds to one acid group per 72 a.m.u. In general, high molecular weight polyacrylic acid has a number average molecular weight of between about 40,000 and about 500,000. A preferred high molecular weight polyacrylic acid has a number average molecular weight of between about 50,000 and about 200,000. Low molecular weight polyacrylic acid preferably has a number average molecular weight of between about 500 and about 40,000. Preferred low molecular weight polyacrylic acid has a number average molecular weight of between about 1,000 and about 20,000.

As shown in Table 2, the polyacrylic acid was found to be effective at 0.06 weight percent. It is expected that polylacrylic acid will provide an effectiveness at a level of about 0.01 weight percent, or about 0.02 weight percent. Furthermore, a level of 0.25 weight percent was found to be effective without adverse consequences. Applicants expect that polyacrylic acid can be included at a levels of about 1 or 2 weight percent without adverse reaction. Too much polyacrylic acid is expected to result in a high acid content which can cause depolymerization of polylactide.

The preferred amount of multifunctional carboxylic acid depends on the catalyst level and on the acid functionality per atomic mass unit. It is expected that at the above identified preferred catalyst levels and for multifunctional carboxylic acids having an acid functionality of greater than about one carboxylic acid group per 250 a.m.u., the preferred level of multifunctional carboxylic acid is within the range of about 0.01 weight percent to about 2 weight percent, and is preferably within the range of about 0.02 weight percent and about 1 weight percent, and more preferably within the range of about 0.04 weight percent and about 0.3 weight percent.

Applicants note that polyacrylic acid has a structure shown by the formula below.

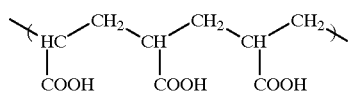

While this structure is a polymer, it is a carboxylic acid having acid groups on carbons which are five carbon atoms apart (inclusive of the carbonyl atom). Applicants believe that the mode of stabilization for polyacrylic acid is likely to be similar to that for the dicarboxylic acids. It should be understood that copolymers of polyacrylic acid can be used. In order to maintain the separation between acid groups, the copolymers of polyacrylic acid which are preferred include block copolymers of polyacrylic acid.

Further experiments were performed to determine the key features of the stabilization. A copolymer, denoted by PAA-MMA in the table, was prepared by doing a random copolymerization of acrylic acid and methyl methacrylate, with 41.7 mole % of acrylic acid residues. This compound was tested at 0.3 wt % in PLA in order to provide the same acid content as 0.12 wt % of polyacrylic acid (PAA). Table 1 shows that although the PAA-MMA copolymer was effective at slowing lactide reformation, it was much less effective than an equivalent acid content in the regular PAA. This supports applicant's theory that the spacing of the carboxylic acid groups is important for providing catalyst deactivating effect.

A second polymer, PMA-MMA, was prepared as a random copolymer of maleic anhydride and methyl methacrylate, with 23.4 mole % of maleic anhydride residues. This polymer was found to be ineffective in preventing lactide reformation. The maleic anhydride residues have the potential to form a pair of carboxylic acid groups on carbons 4 atoms apart if reacted with water. The lack of effectiveness of anhydrides, in dry conditions, shows that the mechanism of action is not through anhydride formation. Anhydrides, formed either in-situ or added directly, might be expected to react with the hydroxyl groups and cause end-capping. However, these results show that the anhydrides do not significantly slow lactide formation at 260° C. The results reported in the table for stearic anhydride corroborate that anhydrides are ineffective under melt-mixing and melt-processing conditions for preventing lactide reformation. It is expected that under moist conditions, some anhydrides may be useful once they have been hydrated to the diacid form.

It should be appreciated that by utilizing an oligomer or polymer as the deactivating agent for polylactide based polymer compositions, the resulting composition can be referred to as a blend of polymers.

Other polycarboxylic acids which may act as deactivating agents include copolymers of acrylic acid with other monomers, to form such polymers as poly(ethylene co-acrylic acid), poly(styrene co-acrylic acid), other polymers with pendant acid groups such as poly(malic acid) and copolymers, poly(maleic acid), polymers of amino acids, especially polymers of acidic amino acids such as poly (aspartic acid), poly(glutamic acid), and their copolymers. In some cases, it may be desirable to improve compatibility between the polycarboxylic acid and the polylactide polymer, in which case a variety of techniques may be possible. A particularly advantageous technique may be to make block copolymers of polylactide/polycarboxylic acid, for example, by reacting a hydroxyl or amine terminated low molecular weight polycarboxylic acid with lactide.

Applicants believe that useful deactivating agents might also be made by partially hydrolyzing anhydride polymers and copolymers, for example, by partially hydrolyzing poly (styrene maleic anhydride), poly(ethylene maleic anhydride), poly(propylene maleic anhydride), or maleic anhydride grafted poly(lactide). The anhydride groups are beneficial in that after hydrolysis the acid groups will be provided with a preferred spacing.

Other potential candidates include naturally derived products such as carboxymethyl cellulose and other acidified or negatively charged gums. Also, solid supported materials such as cation exchange resins including materials such as sulfonated polystyrene resin may be useful. A variety of polyesters with pendant carboxylic acid groups might be useful. Such polyesters could be formed, for example, by the reaction of diols with dianhydrides or multifunctional acids. The diols might also have a pendant acid group and be coupled with conventional coupling agents. An example would be the reaction of dimethylol proprionic acid, coupled with an isocyanate.

(d) Other Materials

Polyphosphoric acid, a strong mineral acid, was found to effectively slow lactide reformation, but generally resulted in a polymer of poor color and lower molecular weight. It is believed that other strong acids, defined here as those having a pKa of less than about 2, would also provide stabilization. These acids have been used in the art, often in combination with a solvent, to provide catalyst deactivation. Applicants believe that under melt blending or melt processing conditions strong acids will lead to dark color and unfavorable polymer characteristics. The carboxylic acids tested generally have pKa's of 2.5 to 6.0 and do provide the dark color observed with polyphosphoric acid.

Citric acid was not found to be effective at high temperature, although it provided stabilization at 240° C. It is believed that the citric acid decomposes at the higher temperature and is, therefore, a less preferred multicarboxylic acid. EDTA (ethylenediaminetetraacetic acid) and MD1024 (MD1024 is available under the tradename Irganox™ from Ciba-Geigy Corporation, and is 1,2 bis(3,5-di-t-butyl-4 hydroxyhydro cinnamoyl) hydrazine) were also tested and found to be somewhat effective at 240° C. but significantly less effective at 260° C. The EDTA was found to be more effective than the MD1024.

2. End-capping

Another method of reducing the formation of cyclic monomer involves end-capping. In the context of polylactide polymers, it is believed that the "unzipping" reaction may occur by the "back-biting" mechanism where the free hydroxyl group attacks the ester group. It is expected that end-capping the hydroxyl group can stabilize the polymer to prevent cyclic ester formation. It should be appreciated, however, that end groups which have not been capped would still be active and some level of reformation would be expected to occur. Also, hydrolysis or other random chain scission is generally observed during processing and would create new hydroxyl end groups which would be active for attacking the ester groups. Furthermore, it should also be noted that the "back-biting" reaction may not occur at the end group at all, but may, in fact, be the reverse reaction of a mid-chain insertion reaction. In that case, end-capping would not effectively stop cyclic ester formation. Prior end-capping techniques utilize an anhydride, such as acetic anhydride, in the presence of a solvent. In this prior art technique, it is not clear whether the observed results may be due to an artifact of the treatment rather than the attempted end-capping.

3. Use of Polymer Chain Interrupts

Applicants expect that the rate of formation of cyclic monomer can be reduced by including units in the polymer chain which are slow to form cyclic monomer or which do not form a cyclic monomer at all. Applicants expect that copolymer agents including caprolactone, morpholinedione, monomers with epoxide functionality carbonates, anhydrides, ester-ethers and cyclic diesters would be difficult to reform. Accordingly, polymerizing lactide with these materials monomers would be expected to provide a relatively high molecular weight polylactide (in contrast to the molecular weight of polylactide obtained by direct condensation of lactic acid) having increased stability.

4. Catalyst Concentration

Another method of reducing the formation of cyclic monomer involves controlling the initial catalyst concentration and/or removing the catalyst residue. Prior teachings indicate that some increase in polymer stability can be achieved by removing the catalyst. One technique involves dissolving the polymer in a solvent and then treating with a second solvent to remove the catalyst and then precipitate the polymer. In the preferred embodiments of the present invention, the polymer is treated in the melt and without addition of solvent. This means that catalyst removal would be difficult, but results in a simpler, more cost-effective, more environmentally sound process.

Example 7 presents a calculation showing how polymerization time to achieve 90% conversion will vary as a function of catalyst level, at a polymerization temperature of 190° C. The calculated rates of lactide reformation are also shown. Reducing the catalyst level does reduce the rate of lactide reformation, but at the expense of longer polymerization times. This leads to a more costly process as well as to some additional degradation during the polymerization. Applicants believe that in order to produce a very highly stable polymer it will be desirable to control the level of catalyst addition and to deactivate the catalyst residue.

B. Molecular Weight Degradation Stability

Molecular weight degradation has at least two major components. The first, active especially at low temperature and all the way through melt processing temperatures, is random chain scission due to hydrolysis. This process is well known in polyesters. Accordingly, it is generally desirable to thoroughly dry aliphatic polyesters before melt processing in order to reduce chain scission.

Figure 5:
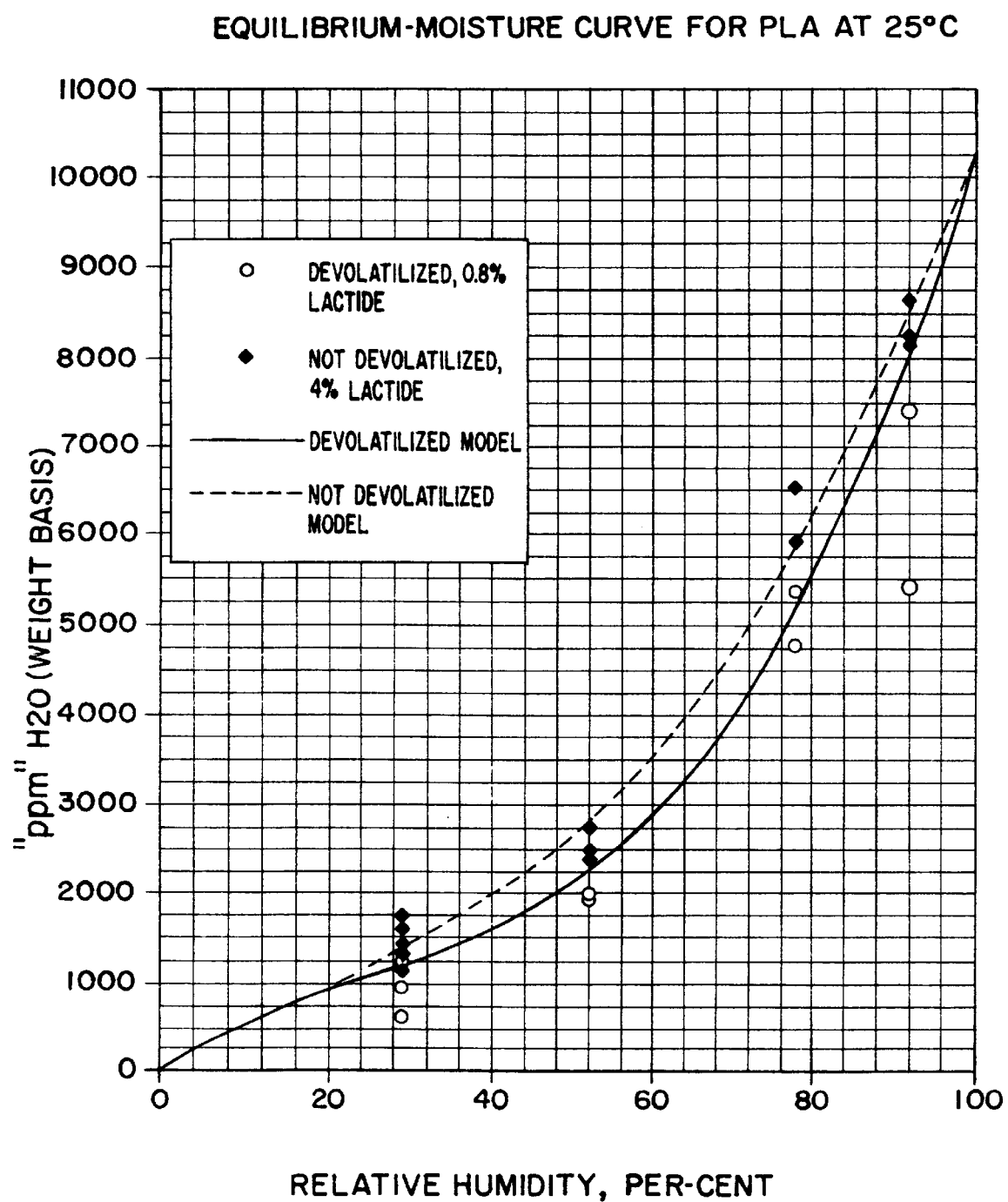
FIG. 5 is a graph of the equilibrium-moisture curve for polylactide at 25° C.

Applicants believe that at typical melt processing conditions the hydrolysis reaction is at least partially catalyzed. See example 3 of U.S. Pat. No. 5,338,822. Witzke, Ph.D. Dissertation, Michigan State University, 1997, has shown the hydrolysis reaction to be characterized by an activation energy of about 33 kJ/mol in the presence of a $S_n(+2)$ catalyst. At melt processing temperatures of about 200° C. or less, this will be a dominant form of molecular weight loss, and catalyst deactivators may slow the reaction and provide some stabilization. Thorough drying is still important, however. A vented (vacuum or inert gas sweep) extruder screw design may also sweep moisture from the system. FIG. 5 provides a moisture versus relative humidity curve for polylactide. It can be seen that moisture contents in excess of 1,000 ppm will be reached if polylactide is stored at a relative humidity of greater than 25%. As a result, thorough drying is important. In-line drying is preferred, and a sealed environment is desired.

At higher temperatures, such as 230° C. or greater, as experienced in some applications, other forms of degradation become more important. These are generally referred to as thermal degradation reactions and have been discussed in various references. The activation energy for this complex of reactions appears to be about 126 kJ/mol. Witzke, Ph.D. Dissertation, Michigan State University, 1997. No clear dependence on normal catalyst activity has been demonstrated, and the deactivating described earlier are not expected to have a strong effect on that basis. Fiber production from either melt spinning or melt blown operations and paper coating are two very high temperature applications where this type of degradation may be particularly important. Free radical scavengers or terminators are expected to be useful in this application to control molecular weight loss.

These same reactions, or perhaps oxidative degradation, may also be important in the anhydrous conditions experienced during polymerization. Various examples in U.S. Pat. No. 5,338,822 show the effectiveness of phosphite antioxidants in a higher molecular weight polylactides; and when added during polymerization.

Table 2 reports the apparent molecular weight decline during the lactide reformation test at 260° C. and 20 minutes. The results, based on the number average molecular weight, are reported as chain scission events in meg/kg-hr. Some of the additives, such as tartaric acid, are effective at preventing lactide reformation, but not at preventing molecular weight degradation. This supports the idea that the molecular weight degradation under these conditions is not primarily catalytic.

The phosphite stabilizers, particularly TNPP, were found to reduce the apparent molecular weight decline. This may be due to a chain coupling effect, as reported in the literature for PET/TNPP or nylon-6/TNPP. That is, the chains still are breaking, but a chain coupling agent is present and recombines them. In the present case, applicants have even found an increase in molecular weight when phosphites are compounded into the polymer composition, as shown in Example 5. Surprisingly, for polylactide, even the distearyl pentaerythritol diphosphite (Weston 618) was found to be at least somewhat effective. Aharoni et al., J. Polym. Sci., Polym. Chem., 22, 2567–2577 (1984) had tested a variety of phosphites in nylon-6 and found them to be very ineffective as a chain coupling agent.

Applicants found that polyacrylic acid functioned to reduce the rate of molecular weight decline. No obvious mechanism of chain coupling is apparent for this system.

The fact that phosphite compounds are useful as chain extension agents might also make them useful for making copolymers, such as between polycaprolactane and PLA or other pairs of aliphatic polyesters. It might also work between an aliphatic polyester and an aromatic polyester. The copolymers would form when a single phosphite center joined two or more disparate types of polyester to form a single new copolymer molecule. This reaction might be carried out in a process of reactive extrusion.

C. Color Formation Stability

Phosphite antioxidants were previously reported to stabilize against color formation in U.S. Pat. No. 5,338,822.

Applicants have confirmed that finding and have found that polyacrylic acids, when compounded into the polymer reduce color formation during subsequent processing. Additives such as alginic acid, aspartic acid, and polyphosphoric acid were found to cause increased yellowing or browning. This is shown in Example 1. The purity of lactide used in the polymerization also affects color formation, with less color formed when high purity lactide is used.

The use of dies, especially blue or violet dyes, can be used to counteract the yellow color in polylactide.

III. Additional Components Of The Polymer Composition

The polylactide polymer composition of the invention can include additional components or additives in addition to the above-described stabilizing agents. These additional components include plasticizers, nucleating agents, fillers, surface treatments, surfactants, pigments, catalysts, finishing oils, lubricants, rheology modifiers, crystallinity modifiers, and antioxidants.

Plasticizers

For most polylactide polymer compositions, it is believed that the glass transition temperature can be lowered to desirable levels by adding a plasticizer component to provide a concentration of about 0.5 to 20 percent by weight plasticizer, based on the weight of the polymer composition. Generally, a sufficient amount of plasticizer should be incorporated to provide a desired reduction in $T_g$. It is believed that the plasticizer level should be above at least 1 percent by weight, and more preferably above at least 2 percent by weight, to provide sufficient flexibility and softness. Accordingly, the plasticizer should be included to provide a concentration level of about 1 to 10 percent by weight.

The selection of the plasticizer can involve consideration of several criteria. In particular, because of the large surface area of polymer exposed during fiber formation, it is desired to provide a plasticizer which does not volatilize to a significant extent. In addition to the reduction in fumes, this would result in a reduction of plating. It is generally desirable to provide as much biodegradability as possible, it is preferred to use a plasticizer which is biodegradable, non-toxic, compatible with the resin, and relatively nonvolatile. Plasticizer in the general classes of alkyl or aliphatic esters, ether, and multifunctional-functional esters and/or ethers are preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Preferred plasticizer are tricarboxylic esters, citrate esters, esters of glycerine and dicarboxylic esters. More preferably, citrate esters are preferred since it is believed that these esters are biodegradable. These plasticizer can be obtained under the names Citroflex A-4®, Citroflex A-2®, Citroflex C-2®, Citroflex C-4® (from Morflex).

Volatility is determined by the vapor pressure of the plasticizer. An appropriate plasticizer should be sufficiently non-volatile such that the plasticizer stays substantially in the composition throughout the process needed to produce the multilayer structure, and to provide desired properties when the structure is used. Excessive volatility can lead to fouling of process equipment, and can result in undesired plasticizer migration. Preferred plasticizer should have a vapor pressure of less than about 10 mm Hg at 170° C., and more preferred plasticizer should have a vapor pressure of less than 10 mm Hg at 200° C. A most preferred plasticizer has a vapor pressure of less than 1 mm Hg at 200° C.

Internal plasticizer, which are bonded to the lactic acid residue containing polymer, may also be useful in the present invention. Exemplary plasticizer which can be bonded to the polymer include epoxides. Plasticizers which are normally solid at room temperature can additionally be used.

Nucleating Agents

It may be desirable to include nucleating agents when increased crystallinity is desired. Nucleating agents may include selected finely divided minerals, organic compounds, salts of organic acids and imides and finely divided crystalline polymers with a melting point above the processing temperature of poly(lactide). Examples of useful nucleating agents include talc, sodium salt of saccharin, calcium silicate, sodium benzoate, calcium titanate, boron nitride, copper phthalocyanine, isotactic polypropylene, low molecular weight poly(lactide) and polybutylene terephthalate.

Plasticizers have also been observed to increase the rate of crystallization.

In the present invention, a polymer composition is considered to be semicrystalline it if exhibits a net melting endotherm of greater than 10 J/g of polymer when analyzed by differential scanning calorimetry (DSC). To determine whether a polymer composition layer is semi-crystalline, it can be tested in a differential scanning calorimeter, such as by Mettler. The details of performing a test of crystallinity are known to those skilled in the art and are identified in U.S. patent application Ser. No. 08/110,394, filed on Aug. 23, 1993, the complete disclosure being incorporated herein by reference.

An exemplary application where crystallinity may be desired includes pellets which are provided for further processing in an extruder. Generally, it is advantageous for the pellets to be semicrystalline in order to decrease incidence of sticking during storage or in the hopper prior to melting, or to the extruder screw or barrel during melt processing in an extruder.

Fillers

Fillers may be desired in order to modify the polymer density, conductivity, or modulus. In certain applications, fillers may be helpful for preventing blocking or sticking of polymer during storage and transport. Such applications include, for example, rolls of films and stacks of thermoformed articles. In the case of fiber formation, fillers are generally not desirable because they sometimes clog the spinnerets.

Inorganic fillers include clays and minerals, either surface modified or not. Examples include talc, diatomaceous earth, silica, mica, kaolin, titanium dioxide, and wollastonite. Preferred inorganic fillers are environmentally stable and non-toxic.

Organic fillers include a variety of forest and agricultural products, either with or without modification. Examples include cellulose, wheat, starch, modified starch, chitin, chitosan, keratin, cellulosic materials derived from agricultural products, gluten, nut shell flour, wood flour, corn cob flour, and guar gum. Preferred organic fillers are derived from renewable sources and are biodegradable. Fillers may be used either alone or as mixtures or two or more fillers.

Surface Treatments

Surface treatments may also be used to modify polymer properties. For example, to increase printability, to modify glass, or to reduce blocking. Such treatments include corona and flame treatments which reduce the surface tension between the poly(lactide) based polymer and the adjacent surface. Also included are embossing techniques and callendaring techniques, and needle punching. These techniques can be used to modify roughness, friction, etc.

Surfactants

Surfactants which are useful can be subdivided into cationic, anionic, and nonionic agents.

With regard to cationic compounds, the active molecule part generally consists of a voluminous cation which often contains a long alkyl residue (e.g. a quaternary ammonium, phosphonium or sulfonium salt) whereby the quaternary group can also occur in a ring system (e.g. imidazoline). In most cases, the anion is the chloride, methosulfate or nitrate originating from the quaternization process.

In the anionic compounds, the active molecule part in this class of compounds is the anion, mostly an alkyl sulfonate, sulfate or phosphate, a dithiocarbamate or carboxylate. Alkali metals often serve as cations.

Nonionic antistatic agents are uncharged surface-active molecules of a significantly lower polarity than the above mentioned ionic compounds and include polyethylene glycol esters or ethers, fatty acid esters or ethanolamides, mono- or diglycerides or ethyoxylated fatty arnines. The above surfactants may also act as antistatic agents, which may be desirable.

Colorants

Pigments, dyes, or color agents may also be added as necessary. Examples include titanium dioxide, clays, calcium carbonate, talc, mica, silica, silicates, iron oxides and hydroxides, carbon black, magnesium oxide, quinacridone, copper phthaloryanine, ultra marine blue, anthraquinone, pyrazolone, violet B, azo dyes, 2,2'-(1,2-ethenediyldi-4,1-phenylene)bisbenzoxazole, and 2,2'-(2,5-thiophenediyl)bis(5-tert-butylbenzoxazole).

Catalysts

In the manufacture of polylactide compositions of the present invention, the reaction to polymerize lactide is preferably catalyzed. Many catalysts have been cited in literature for use in the ring-opening polymerization of lactones. These include but are not limited to: $SnCl_2$, $SnBr_2$, $SnCl_4$, $SnBr_4$, aluminum alkoxides, tin alkoxides, zinc alkoxides, SnO, PbO, Sn (2-ethyl hexanoates), Sb (2-ethyl hexanoates) (sometimes called octoates) Ca stearates, Mg stearates, Zn stearates, and tetraphenyltin. Catalysts based on rare earth metals are also effective for ring-opening polymerization. Applicants have also tested several catalysts for polymerization of lactide at 180° C., which include: tin(II) bis(2-ethyl hexanoate) (commercially available from Atochem, as Fascat 2003, and Air Products as DABCO T-9), dibutyltin diacetate (Fascat 4200®, Atochem), butyltin tris (2-ethyl hexanoate) (Fascat 9102®, Atochem), hydrated monobutyltin oxide (Fascat 9100®, Atochem), antimony triacetate (S-21, Atochem), and antimony tris(ethylene glycoxide) (S-24, Atochem). Of these catalysts, tin(II) bis (2-ethyl hexanoate), butylin tris(2-ethyl hexanoate) and dibutyltin diacetate appear to be most effective.

Finishing Oils

For some applications, it may be useful to apply surface treatments to provide fiber lubricity, change hydrophilicity, alter static characteristics, modify fiber appearance and ultimately affect fiber cohesion. An example of such surface treatments are finishing oils. Finishing oils may affect the above fiber properties, but also affect down stream fiber processes. Such processes include manufacturing of yarns and carding. Examples of some of the finishing oils that could be used for PLA include stearates or other commercially available proprietary oils.

Lubricants

For certain applications, it is desirable to provide good slip properties. Lubricating solids such as fluoropolymer powders or graphite are sometimes incorporated into materials to increase slip properties. The fatty acid esters or hydrocarbon waxes commonly used as lubricants for the melt state, are gradually exuded, if used in very high concentrations, thus yielding to permanent lubricating effects. Certain additives migrate so strongly to the surface, even during cooling, that a uniform invisibly thin coating is formed. Thus, these slip agents may be important in the production of coatings which are used in automatic packaging machines. Preferred lubricants have been found to reduce amperage for operating the screw of an extruder about 10 to about 15% when added at about 1000 ppm by weight (compared to amperage without lubricant).

Internal lubricants which can be used in the present invention include fatty acid esters, amides, metal salts and soaps, and paraffin or hydrocarbon waxes. Examples of useful lubricants include Zinc stearate, Calcium stearate, Aluminum stearate, stearic acetiatic, White Beeswax, Candelia Wax, high MFI LDPE, Eastman Epolene N21, Eastman Epolene E20, and Loxiol HOB7119. Preferred internal lubricants include Aluminus stearate and stearic acetate.

IV. Preferred Polylactide Characteristics for Various Applications

It is desirable to provide a polylactide polymer composition for a given application with desirable physical properties and desirable stability properties. Various applications for the polylactide polymer composition of the invention include the formation of fibers, coating paper, formation of films, injection molding, thermal forming, injection blow molding, preparing filmed articles, and preparing twine. It should be appreciated that stability requirements for a particular application can be more or less stringent than the stability requirements for another application. The various conditions of processing and preferred stability features for several categories of polymer composition are described in detail below.

While the specific polylactide polymer compositions for given applications are described below, there are general characteristics desirable for the polylactide polymer composition. Preferably, the polylactide polymer has a number average molecular weight in the range of about 25,000 to 200,000, and more preferably within the range of about 75,000 to about 125,000. In addition, the polylactide polymer preferably has a weight average molecular weight within the range of about 50,000 to about 400,000, and more preferably within the range of about 150,000 to about 250,000. The devolatilized and dried composition preferably has a lactide level which is less than 1 wt %. More preferably, the lactide level is less than about 0.5 wt %, and even more preferably less than about 0.3 wt %, and even more preferably less than about 0.2 wt %. While it is believed desirable to completely remove the lactide from the composition, this may not be practical because small amounts of lactide may re-form. Accordingly, it is expected that the lactide level will be at least above 0.001 wt %. In the devolatilized and dried composition, it is desirable for the water concentration to be less than about 500 ppm, and more preferably less than about 200 ppm. In a particularly preferred embodiment, the water concentration is less than about 100 ppm.

The polylactide polymer composition can be characterized in terms of its stability against the lactide reformation reaction under conditions often encountered during melt processing. Accordingly, the stabilized polylactide polymer composition will preferably satisfy the following relatively severe test. In this test, a portion of the composition is devolatilized and dried to provide a lactide concentration of less than about 1% by weight and a water concentration of less than about 500 ppm. After holding the devolatilized and dried polylactide polymer composition at 260° C. for 20 minutes in a closed container, the increase in wt % lactide should be less than 2% by weight. Preferably, the increase in the weight percent of lactide should be less than 1% by weight, and more preferably less than 0.5% by weight. In particularly stable polylactide polymer compositions, the increase in the weight percent of lactide will be less than 0.2 wt %. It should be appreciated that the test can be specified in that the devolatilizing and drying occurs until the composition reaches a lactide concentration of 1 wt % and a water level of 500 ppm. In addition, if the composition to be tested already possesses a lactide concentration of less than 1 wt % and a water concentration of less than 500 ppm, there is no need to devolatilize and dry before holding the sample at 260° C. for 20 minutes.

A. Fiber Grade Polylactide

Applicants discovered the conditions of fiber formation tend to be fairly extreme compared with other applications, and that the conditions tend to promote lactide reformation and molecular weight degradation. Conditions in the extruder often exceed 200° C., and the surface area generated during fiber formation often result in increase the contact between equipment and/or air and melted polylactide. The processing condition can be more extreme than, for example, the conditions often encountered when processing polylactide into films or molds. As a result, conditions during fiber formation favor degradation of the polymer. Accordingly, in order to ensure desirable fiber properties, it is advantageous to provide the polylactide polymer composition, prior to melt processing, with desired molecular weight ranges, PDI, optical composition, and melt stability. In the context of fiber formation, the disclosure of U.S. patent application Ser. No. 08/850,319 filed on May 2, 1997, is incorporated by reference herein in its entirety.

In the case of melt blown fibers, it is preferable that the polylactide polymer is provided with a number average molecular weight of between about 25,000 and 110,000. Or preferably, the number average molecular weight is provided between about 30,000 and about 75,000, and even more preferably between about 32,000 and about 60,000. In most preferred applications, it is anticipated that the polylactide polymer will have a molecular weight within a range of about 35,000 and about 45,000. It should be understood that the lower limit on the number average molecular weight is determined by physical properties such as tensile strength. The upper limit on number average molecular weight is generally determined by consideration such as viscosity in the melt blown process.

In the case of spun-bond or melt spinning, it is desirable to provide a number average molecular weight within the range of about 25,000 to about 150,000. Preferably, the number average molecular weight is provided within a range of from about 45,000 to about 105,000, more preferably between a range of about 50,000 to about 90,000, and it is believed that the number average molecular weight will be most preferably in a range of from about 55,000 to about 75,000. In the spun-bond or melt spinning processes it should be appreciated that the lower limit on the molecular weight is generally a function of melt strength and tensile strength. The upper limit on the molecular weight is generally determined by pressure drop through the die, and the desire not to process the polymer at excessively high temperatures.

Furthermore, the melt flow index of the polylactide polymer should be between about 10 to about 50, using standard ASTM melt flow testing procedures (ASST. D1238), measured at 210° C. with a 2.16 Kg weight. More preferably, the melt flow index is between about 15 and about 45.

The preferred polylactide polymers for use in fiber formation are preferably melt-stable. By this, we mean that the polylactide polymer will be relatively stable to lactide reformation and depolymerization at temperatures encountered during melt processing. With respect to this, the disclosures concerning melt stability provided in U.S. Pat. Nos. 5,338,822 and 5,525,706 are incorporated herein by reference.

Furthermore, it should be understood that preferred melt-stable polylactide compositions for fiber formation preferably include a lactide concentration of less than about 1% by weight, more preferably a lactide concentration of less than about 0.5% by weight, and even more preferably a lactide concentration of less than 0.3% by weight. Most preferably, to ensure melt stability properties, it is preferred that the lactide concentration is less than about 0.15% by weight. In addition, it is preferred that the extent of lactide generation during melt processing, such as through an extruder, provides generation of less than about 0.5% by weight lactide. Thus, it is expected that for preferred melt-stable polylactide polymers, melt processing will only generate less than about 0.5% lactide, and even more preferably less than about 0.3% by weight lactide.

B. Coating Grade Polylactide

In order to process polylactide polymer on commercial extrusion coating equipment, the polylactide polymer should have good melt elasticity. This is because it is desirable to extrude and draw down thin coatings of polylactide polymer with minimal neck-in at high velocities at the high temperatures required for good adhesion to paper. Details of coating paper with a polylactide polymer composition is described in detail in U.S. patent application Ser. No. 08/862,612, filed on May 23, 1997, the entire disclosure of which is incorporated herein by reference.

Coating grade polylactide has characteristics which allow it to be processed on conventional paper coating equipment typically designed for processing polyethylene. Applicants have found that linear polylactide is generally not suitable for processing on conventional paper coating equipment. It is believed that the reason for this is that linear polylactide does not possess the melt elasticity needed to provide commercially acceptable throughput at acceptable levels of neck-in and coating stability. Linear polylactide will generally have a molecular weight characterized by a Flory-Schultz distribution (also known as the "most probable distribution.") This distribution is generally characterized by a polydispersity index (PDI) of less than about 2.2 (ideally about 2.0) and a $M_z/M_n$ ratio of about 3.0. Most conventional linear polylactide polymers will have values somewhere near these PDI and $M_z/M_n$ values. Some deviation due to variations in polymer processing are expected, but it is also expected that the polymer will exhibit general linear polymer characteristics. This equates to a low degree of chain entanglement and a low melt elasticity. Methods of increasing molecular interaction or chain entanglement are described in detail in U.S. Pat. No. 5,594,095 in columns 4–24, this portion of U.S. Pat. No. 5,594,095 being incorporated herein by reference. Generally, these methods involve increasing molecular weight, increasing branching, or increasing bridging.

It has been observed that increasing molecular weight tends to increase molecular entanglement and also increase viscosity. If the viscosity becomes too high, the polymer will no longer be processable nor will it penetrate into the paper surface for Eadhesion. Raising the temperature to the level necessary for processing linear polylactide is not practical because melt elasticity is sacrificed and the extent of polymer degradation is increased.

To compensate for the seemingly contradictory properties of increasing melt elasticity while maintaining low viscosity, it is preferable to broaden the molecular weight distribution. The breadth of the molecular weight distribution (MWD) can be characterized by the polydisperisty index (PDI, defined as $M_w/M_n$) or by the ratio Mz/Mn. In addition to increasing the MWD, the high viscosities resulting from increased weight average molecular weight (Mw) can be compensated by blending low molecular weight polymer back into the resin. It is believed that this can be done by adding tackifying resins or low molecular weight fractions of polylactide.

Bridging and branching are preferred methods for increasing chain entanglement and thereby broadening the molecular weight distribution. The degree of chain entanglement is proportional to the type of chain branching or bridging. Long chain branching favors chain entanglement over short chain branching.

Applicants have found that a broadened molecular weight distribution generally provides desirable melt elasticity. The melt elasticity can be directly assessed by measuring die swell ratio on the extrudate of a melt flow index instrument according to ASTM-D1238 with an 0.0825 inch diameter die and conducted at a 210° C. and 2.16 kg, and reported in grams of polymer per 10 minutes. Die swell is a measure of the ratio of the diameter of the extrudate to that of the die. In the context of this invention, the property of "die swell" is determined by cutting off the polymer strand issuing from the melt flow index test when it is 1 inch long. The diameter of the strand is measured in at least 3 locations and averaged. Generally, this test is repeated about 5 times to improve reproducibility. A Newtonian fluid demonstrates swell ratios of approximately 1.1 or less. As elasticity increases, die swell increases. Accordingly, it is desirable to provide polylactide polymer with a die swell of greater than about 1.25, and preferably greater than about 1.3. Most preferably, the die swell for polylactide according to the invention is greater than about 1.4. By comparison, the die swell of linear polylactide is about 1.2 or less for a melt flow index of 8 or greater, and is about 1.4 or less for melt flow index of 4 or greater, and is estimated to be about 1.5 or less for melt flow index of 2 or greater. This is shown by FIG. 7.

Die swell ratio can be used to access the difference in melt elasticity between polylactide and a commercial grade of low density polyethylene used in extrusion coating. Using a melt flow index instrument at 210° C. and 2.16 kg force, the swell ratio for linear PLA is generally less than or equal to 1.1 whereas the swell ratio for LDPE can be 1.5 or greater. At the same time, the linear PLA tends to provide large neck-in with poor draw down characteristics.

The melted polymer should be provided at a melt viscosity which is sufficient to provide an operating die pressure and allow desired adhesion of the melted polymer to the paper substrate. As discussed above, increasing chain entanglement tends to improve melt elasticity of polylactide, it additionally tends to raise melt viscosity, particularly if it is done by increasing molecular weight. In a preferred process, long chain branching induced by bridging (i.e. by peroxide modification) is used to increase chain entanglement without dramatically increasing melt viscosity. The melt flow index (MFI), as described above, is a useful measure of viscosity. Generally, a high MFI corresponds to a low viscosity material and a low MFI corresponds to a high viscosity material. Linear polylactide exhibits a strong correlation between weight average molecular weight ($M_w$) and MFI, with additional correlation between residual lactide level and MFI. Long chain branching, as preferred in the present composition, causes a deviation from this relationship.

For extrusion coating, applicants have found that the MFI should preferably be within the range of about 2 to about 30. More preferably, the MFI should be in the range of about 8 to about 20, and most preferably in the range of about 12 to about 16.

It is expected that linear polylactide polymer will exhibit die swell values of less than those exhibited by the epoxidized soybean oil modified polylactide polymer. It should be appreciated that high die swell may be obtainable for linear polylactide polymer but only at very low MFI values (of about 2 or less). For preferred paper coating operations, it is desirable to provide a melt flow index of greater than about 1.2. In preferred compositions, the melt flow index will be greater than about 2, and die swell values greater than about 1.3. Even more preferably, the die swell should be above about 1.4. In general, preferred compositions exhibit MFI and die swell values above the solid line shown in FIG. 7. Preferably, the compositions exhibit an MFI in excess of 10 and a die swell in excess of 1.3 (more preferably 1.4).

It should be understood that compositions exhibiting a melt flow index of less than 2 are generally not desirable for paper coating applications.

The reason far the difference in the width of the dies and the width of the paper account for a phenomenon known as "neck-in." Neck-in refers to the narrowing of the width of a film as it leaves a die. During certain melt processing operations, linear polymers such as linear polylactide exhibit certain undesired flow properties, such as neck-in. For example, if polylactide is extruded as a film onto a moving substrate, the film of the polylactide being directed onto the substrate will tend to neck under the tensional forces caused by the moving substrate. This neck-in phenomenon leads to problems with controlling the process and problems with maintaining consistency in film thickness. Linear polymers, such as linear polylactide, also tend to exhibit hydrodynamic instability or draw resonance at high draw ratios. This draw resonance can cause a periodic variation in a coating with and/or gauge, for example, that can lead to rupture of the polymer web.

C. Film Grade Polylactide

The properties of film grade polylactide, and their applications in multilayered structures such as bags, are discussed in detail in U.S. patent application Ser. No. 08/642,329, filed on May 3, 1996, the entire disclosure of which is incorporated herein by reference.

In general, many biodegradable polymers such as non-plasticized polylactic acid polymers are generally too brittle for use as single layer flexible films and/or sheets. Their $T_g$ is generally above 50° C., and it has been observed that they provide a film or sheet having low impact resistance and tear resistance. Tear resistance of a typical polylactide film having a $T_g$ above 50° C. is less than about 6 gm$_f$/mil. Other biodegradable polymers, including certain aliphatic polyesters, exhibit poor tear strength. These physical properties render films or sheets prepared therefrom poor candidates for use as bags or wrappers. Articles such as trash bags, grocery bags, food wrappings, and the like should be flexible and resistant to tearing and puncturing.

By lowering the glass transition temperature ($T_g$) of biodegradable polymers to about 20° C. or less, it is possible to provide a film or sheet having improved flexibility and tear and puncture resistance. More preferably, it is desirable to lower the $T_g$ to below about 5° C., and more preferably below about minus 10° C. These glass transition temperature should be below the temperature at which the polymer is used. When the biodegradable polymer is a lactic acid residue containing polymer, a preferred method for lowering the glass transition temperature ($T_g$) is by adding plasticizer thereto. Plasticizer can be added to a polylactide polymer to lower the glass transition temperature (Td from 60° C., without plasticizer, to 19° C. at a level of 20 percent, by weight, plasticizer.

For most lactic acid residue containing polymers, it is believed that the glass transition temperature can be lowered to desirable levels by adding a plasticizer component to provide a concentration of about 1 to 40 percent by weight plasticizer, based on the weight of the polymer composition. Generally, a sufficient amount of plasticizer should be incorporated to provide a desired reduction in $T_g$ and increase flexibility and tear strength. It is believed that the plasticizer level should be above at least 8 percent by weight, and more preferably above at least 10 percent by weight, to provide sufficient flexibility and tear resistance. The upper limit on plasticizer can be controlled by other considerations such as loss of film or sheet integrity if too much plasticizer is used. Furthermore, too high a concentration of plasticizer will promote migration of plasticizer into the outer layer. Accordingly, the plasticizer should be included to provide a concentration level of about 10 to 35 percent by weight, preferably a concentration level of about 12 to 30 percent by weight, and more preferably a concentration level of about 20 to 35 percent by weight.

Although plasticized lactic acid residue containing polymers can provide desired tear strength, they have shown severe blocking which makes them unsuitable as single layer bags or wrappers. It should be understood that "blocking" is meant to describe the tendency of one layer of a structure to entangle, enmesh or stick to another layer. Thus, two layers exhibiting high blocking are not easily separated to form, for example, a bag. Applicants have found that while reducing the $T_g$ of lactic acid residue containing polymers enhances flexibility and tear strength, it also increases or promotes blocking.

Multilayer structures can be created which are relatively resistant to blocking over time and which retained the desirable properties of a plasticized lactic acid residue containing polymer composition, such as, elongation and tear resistance. The blocking was reduced by incorporating blocking reducing layers which cover the core layer of plasticized lactic acid residue containing polymer. The blocking reducing layers could have a variety of compositions, provided that they reduce blocking. Exemplary preferred blocking reducing layers are described in detail in U.S. patent application Ser. No. 08/642,329, the disclosure blocking reducing layers covering pages 36–44 being incorporated herein by reference.

D. Molding Grade Polylactide

In order to process polylactide polymer composition into moldings, it is desirable to control the molecular weight, the optical composition, and the impact properties depending upon the particular article which is to be formed. For general purpose molding grade polylactide suitable for thermoforming, it is generally desirable to control the residual lactide concentration to less than 0.5% by weight, and more preferably to less than 0.3% by weight. In the context of controlling the optical properties, it is generally desirable to provide an R-lactic acid residual concentration in the polymer of between about 2% to about 6% based on the total lactic acid residual concentration in the polymer. The term "lactic acid residual" refers to the lactic acid repeating unit within the polymer. Controlling the R-lactic acid residual concentration is advantageous because it allows one to provide semicrystalline polymer pellets and noncrystalline (amorphous) thermoformed articles. Applicants have found that semicrystalline pellets are advantageous during extrusion because they provide less screw sticking compared with amorphous pellets.

The general purpose molding grade polylactide composition preferably exhibits a melt flow index of between 6 and 10. In addition, the weight average molecular weight is preferably greater than 160,000, more preferably greater than 180,000, and most preferably greater than 200,000. It is expected that the average molecular weight for this type of polymer will be less than about 350,000. Furthermore, the number average molecular weight is preferably greater than about 80,000, more preferably greater than about 90,000, and most preferably greater than about 100,000. At lower molecular weights, it becomes difficult to trim the molding without fracturing. Furthermore, it should be appreciated that the molecular weights encountered for thermoforming are generally higher in order to accommodate the use of a fraction of regrind.

The general purpose molding grade polylactide polymer composition preferably includes a stabilizing agent, and a lubricant. The lubricant is preferably provided in a concentration of between about 500 ppm and 1,000 ppm in order to provide better flow characteristics for the solid pellets, and to reduce power requirements during extrusion into articles. A preferred lubricant is aluminum stearate.

A preferred polylactide copolymer which can be used includes the polymerization product of lactide and multifunctional epoxidized oil. In the case of epoxidized soy bean oil, this component is preferably provided at a concentration of 0.35 wt %.

E. Foaming Grade Polylactide

It should be appreciated that the properties desired for foaming grade polylactide are generally similar to those properties desired for coating grade polylactide. Accordingly, the properties and characteristics of the coating grade polylactide section of this application can be referred to in the context of foaming grade polylactide.

For forming grade polylactide in general, it is desirable to provide a die swell of greater than 1.45, which indicates a high degree of branching.

In most foaming applications, it is generally desirable to prevent crystallization. Accordingly, in order to provide amorphous foams, Applicants found that it is advantageous to provide the polylactide polymer with a high level of R-lactic acid residuals. This level preferably corresponds to greater than 12% by weight, and more preferably greater than 17% by weight, of the lactic acid residuals forming the polymer. The concentration of lactide in the composition should be less than 0.5 wt %.

The density of the foam product can vary depending upon the application. In the context of a typical clam shell food packaging application, the density should be between about 4 and 6 pounds per cubic foot. It is expected that the foam thickness in such an application will be between about 0.08 and about 0.1 inch. In the context of a meat and poultry tray, it is desirable to provide a density of about 3 pounds per cubic foot. In this type of application, it is expected that the foam thickness will be about 0.1 inch or greater.

V. Stabilization of Nonpolylactide Polymer Systems

Applicants expect that their discoveries with respect to stabilizing polylactide can be applicable to nonpolylactide systems including, for example, polyesters and polyamides.

The equilibrium relationship for ring opening polymerization of cyclic esters is fairly complicated. A system which will not polymerize generally corresponds to a stable ring system, with equilibrium favoring large concentrations of reactants. A system which polymerizes readily corresponds with a system having high concentrations of reaction products. Another type of system polymerizes to a certain extent, but not completely. These systems are of greatest concern because once they have been successfully polymerized, there is still a strong tendency to depolymerize during melt processing. Polylactide generally falls within this latter category.

It is estimated that the above-described depolymerization problem may be important for any polymer where the concentration of cyclic ester is at least 0.1 wt % at processing temperature. If the concentration of cyclic ester at processing temperature is at least 0.5 wt %, and especially if it is at least 1.0 wt % at processing temperatures, then the methods of controlling the cyclic ester formation reaction described herein may be particularly helpful. Polylactide is typically processed at least 180° C., and the equilibrium concentration of lactide at this temperature is about least 3 wt %.

The categories of cyclic monomers which can be polymerized, and therefore, where depolymerization to cyclic esters may be problematic, include cyclic esters such as lactones, cyclic diesters such as glycolides, ester-ethers, and ester-amides. Of particular concern are those systems which can form 5-, 6-, or 7-member rings. An example includes polyparadioxanone.

Although the problem is most noticeable for polymers which can form cyclic ester monomers, other polymers can form larger ring systems through intersterification. The formation of these macrocyclic oligomers may also be reduced by the method presented in the present disclosure.

The following examples include several tests. The test methods relied upon in several of the examples are provided below.

In the lactide formation test, a sample of polymer is chopped or pelletized. It is then dried and devolatilized in a vacuum oven at 110–1 20° C. for 18 to 48 hours. The residual lactide level at this point should be less than 1 wt. %. The sample is then placed in a closed container with a means for heating quickly to a preset temperature, with means provided for sampling at various times and quickly cooling the samples. A convenient method is to use the barrel of a capillary rheometer, such as a Rosand Model RH7X-2. This allows rapid heating and convenient sampling by extruding a small sample into a container. The lactide level of the sample is then determined by any accurate means, such as the FTIR method above, a GPC method, or by dissolving the polymer, precipitating, and analyzing the lactide solution by gas chromatography.

Lactide determinations were made by pressing films with a thickness of about 3–16 mils on a Carver press. The films were then analyzed using FTIR, on an instrument which had been calibrated for residual lactide in polylactide. Calibration standards had been analyzed using the primary method of gas chromatography, which had been developed using standard additions.

Molecular weights were generally determined using gel permeation chromatography (GPC). Polymer samples were dissolved in methylene chloride as a 10 wt. % solution, this is then further reduced 20:1 with THF to give a 0.5 wt. % solution. This solution is passed through a series of Styragel* HR columns from Waters Chromatography. The mobile phase is THF at a temperature of 35° C. A refractive index detector is used with relative molecular weight calibrations using polystyrene standards. Millennium Version 2.15 software was used for acquisition and evaluation.

EXAMPLE 1

Effect of Additives on Lactide Reformation and Molecular Weight

Several tests were performed using a polylactide polymer composition which was prepared in a continuous reactor at a temperature of 1 80° C. The polymer was prepared from a monomer mixture containing lactide, 0.35 wt % epoxidized soybean oil (G62 available from C. P. Hall Co.) and 0.015 wt % of distearyl pentaerytlritol diphosphite process stabilizer (Weston 618 available from General Electric). Catalyst was added at a molar ratio of catalyst to lactide of 1:10,000. The catalyst was tin II bis(2-ethyl hexanoate) which is available as Dabco T-9 from Air Products and Chemicals, Inc. The reaction mixture was polymerized to provide a polymer composition having a number average molecular weight of 64,000, a weight average molecular weight of 194,000, a PDI of 3.0, and a residual lactide content of about 1.4% lactide. The polymer was found to have an optical composition of 4.2% R-lactic acid residuals and 95.8% S-lactic acid residuals as determined by chiral liquid chromatography on the saponified polymer.

The various additives listed in Table 1 were mixed into the polylactide composition using a Brabender mixing head at a temperature of about 190–200° C. Mixing time did not appear to be critical to the results, and mixing times of 2–10 minutes were used. After mixing, the polymer composition was chopped and dried and devolatilized in a vacuum oven. Typical conditions were 110–120° C. for 18–48 hours.

The dried and devolatilized samples were then placed into a capillary rheometer which was used to heat the samples and hold them at the desired testing temperature for 20 minutes. Samples were normally taken at t=5 minutes and tP=10 minutes, although only the 20 minute times are reported here. The t=0 minutes point corresponds to 5 minutes after placing the pellets into the capillary barrel and can be considered the initial heat up time.

Samples from t=20 minutes were pressed into films on a Carver press at about 150° C. and 10,000 psi. Residual lactide levels was determined by Fourier Transform Infrared Spectroscopy (FTIR). The films were analyzed using FTIR, on an instrument which has been calibrated for residual lactide and polylactide. Calibration standards have been analyzed using the primary method of gas chromatography which had been developed using the method of standard additions. Molecular weights were determined by gel permeation chromatography (GPC). In this case, the polymer samples were dissolved in chloroform and passed through a series of Ultrastyragel® columns from Waters Chromatograph. The mobile phase was PHF at a temperature of 35° C. A refractive index detector was used with molecular weight to calibration using polystyrene standards. Millennium Version 2.10 software was used for acquisition and evaluation.

Color was subjectively evaluated. Samples receiving a "good" evaluation reflects a color of water-white to yellow, "medium" reflects a color of light brown, and "poor" reflects a color of dark brown to black.

Table 1 identifies final weight average molecular weight values at test temperatures, and the change in lactide concentration after running the 20 minute test.

TABLE 1

Change in weight percent lactide after 20 minutes at indicated temperatures

| Sample | 240° C. Δ Lactide | 240° C. Final Mw | 260° C. Δ Lactide | 260° C. Mw | Overall Color |
|---|---|---|---|---|---|
| Control 1 | 5.1 | — | 6.7 | — | |
| Control 2 | 4.6 | 127000 | 6.7 | 90000 | |
| Control 3 | 4.7 | 126000 | 7.2 | 88000 | Medium |
| Control 4 | — | — | 7.3 | 87000 | |
| PAA BASED COMPOUNDS | | | | | |
| 0.10 wt % PAA(1) | 0.0 | 146000 | 0.6 | 112000 | |
| 0.1 wt % PAA(2) | 0.3 | 141000 | 0.4 | 110000 | Good |
| 0.25 wt % PAA(1) | 0.0 | — | 0.3 | — | |
| 0.23 wt % PAA | 0.1 | 152000 | 0.4 | 111000 | |
| 0.25 wt % PAA | 0.1 | — | 0.3 | — | |
| 0.3 wt % PAA-MMA* | 0.3 | 136000 | 1.1 | 95000 | |
| 0.3 wt % PMA-MMA* | 1.4 | 125000 | 6.0 | 94000 | |
| PHOSPHITE BASED COMPOUNDS | | | | | |
| 0.1 wt % TNPP | — | — | 5.6 | 88000 | |
| 0.25 wt % TNPP | — | — | 1.2 | 106000 | |
| 0.5 wt % TNPP | — | — | 0.4 | 147000 | |
| 0.5 wt % TNPP | 0.1 | 192000 | -0.2 | 152000 | Good |
| 1.0 wt % TNPP | 0.4 | 189000 | 0.6 | 162000 | Good |
| 0.5 wt % TPP | 0.3 | 156000 | 0.3 | 130000 | Good |
| OTHER COMPOUNDS | | | | | |
| 0.1 wt % polyphosphoric acid | 0.6 | 82000 | 0.8 | 69000 | Poor |
| 0.5 wt % boric oxide | 0.4 | 104000 | 1.1 | 86000 | Medium |
| 0.089 wt % citric acid | 0.6 | 113000 | 6.2 | 72000 | Medium |
| 0.1 wt % EDTA | 1.0 | 106000 | 5.3 | 67000 | Poor |
| 0.84 wt % Luperox 130XL | 1.7 | 118000 | 4.5 | 92000 | |
| 0.28 wt % alginic acid | 1.6 | 66000 | 5.3 | 49000 | Poor |
| 0.25 wt % MD1024 | 2.5 | — | 5.6 | — | |
| 0.25 wt % MD1024 | 2.7 | — | 5.5 | — | |
| 0.4 wt % stearic acid | 2.8 | 119000 | 5.7 | 82000 | |
| 0.38 wt % stearic anhydride | 3.1 | 121000 | 6.3 | 86000 | |
| 0.092 wt % L-aspartic acid | 4.4 | 77000 | 7.5 | 65000 | Poor |

PAA(1) is polyacrylic acid having a weight average molecular weight of about 2,000 which is available from Aldrich Chemical Company.

PAA(2) is polyacrylic acid having a weight average molecular weight of about 450,000 which is available as Carbopol™ 679 from the B.F. Goodrich Co.

PAA-MMA is a random copolymer of acrylic acid and methyl methacrylate, with 41.7 mole % of acrylic acid residues.

PMA-MMA is a random copolymer of maleic anhydride and methyl methacrylate, with 23.4 mole % of maleic anhydride residues.

MD 1024 is 1,2 (bis(3,5-di-t-butyl-4 hydroxyhydro cinnamoyl) hydrazine, available as Irganox™ MD1024 from CIBA-GEIGY Corp.

Luperco™ 130XL is 2,5-dimethyl-2,5-di-(t-butyl peroxy) hexyne-3, 45% on CaCo$_3$, from ELF Atochem North America Inc.

This example shows the efficacy of various additives compounded into a polylactide polymer melt. The efficacy of the various additives can be judged by the amount of lactide reformed in 20 minutes at 260° C. The samples without stabilization are listed as control samples and generally formed in excess of 6 wt % lactide, showing the high degree of lactide formation in the absence of added catalyst deactivators.

EXAMPLE 2

A polylactide polymer composition was prepared in a continuous reactor at a temperature of about 180° C. The polymer was formed from a monomer mixture containing lactide with 0.35 wt % epoxidized soybean oil (G-62 available from C.P. Hall Co.) with 0.015 wt % of distearyl pentaerythritol diphosphite process stabilizer (Weston 618 available from General Electric). Catalyst was added at a molar ratio of catalyst to lactide of 1:80,000. The catalyst was tin II bis(2-ethyl hexanoate) which is available as Dabco T-9 from Air Products and Chemicals, Inc. The mixture was polymerized to provide a polymer composition having a number average molecular weight of 80,000, a weight average molecular weight of 177,000, and a PDI of 2.2. The polymer was found to have an optical composition of 3.8% R-lactic acid residuals and 96.2% S-lactic acid residuals.

Various additives listed in Table 2 were mixed into the polylactide polymer composition using a Brabender mixing head at a temperature of about 190° C. for 2 minutes. A control sample of base polymer, with no additives, was subjected to the same procedure. Samples were then placed into a capillary rheometer; which was used to heat the samples and hold them at the desired testing temperature for 20 minutes. Samples were normally taken at t=5 minutes and t=10 minutes, although only the 20 minute times are reported here. The t=0 minutes point corresponds to 5 minutes after placing the pellets into the capillary barrel (initial heat up time).

Samples from t=20 minutes were pressed into films on a Carver press at about 150° C. and 10,000 psi. FTIR was then used to determine the residual lactide. GPC was used to determine the molecular weights.

The control sample, after 20 minutes at 260° C., had a final lactide level of 6.2 wt % and a weight average molecular weight of 76,000. The sample with added TNPP (0.52 wt %), had a final lactide level of 0.42 wt % and a weight average molecular weight of 121,000. The initial lactide level in each case was between 0.2–0.3 wt %.

TABLE 2

Change in wt % lactide after 10 minutes or 20 minutes at 260° C.

| Sample | Change in lactide, wt % 10 min | Change in lactide, wt % 20 min | Molecular Weight Loss Rate of Chain Seg. Meg/gk-hr. |
|---|---|---|---|
| Control 1 | 2.36 | 4.11 | 43 |
| Control 2 | 2.68 | 4.77 | 42 |
| Control 3 | 2.23 | 5.25 | 37 |
| 0.026 wt % Tartaric acid | 0.32 | 1.14 | 42 |
| 0 053 wt % Tartaric acid | 0.08 | 0.31 | 34 |
| 0.114 wt % Tartaric acid | 0.08 | 0.13 | 35 |
| 0.140 wt % Tartaric acid | 0.02 | 0.06 | 34 |
| 0.11 wt % Succinic acid | 0.36 | 1.53 | 55 |
| 0.10 wt % Adipic acid | 1.28 | 3.8 | 40 |
| 0.56 wt % Dimerized rosin | 0.22 | 1.14 | 38 |
| 0.06 wt % PAA(2)* | 0.04 | 0.11 | 28 |
| 0.10 wt % lactic acid, 98% | 1.76 | 3.43 | 43 |
| 0.22 wt % lactyl lactylate | 1.47 | 3.11 | 116 |
| 0.32 wt % Weston 618 | 0.09 | 0.13 | 25 |

TABLE 2-continued

Change in wt % lactide after 10 minutes or 20 minutes at 260° C.

| Sample | Change in lactide, wt % 10 min | Change in lactide, wt % 20 min | Molecular Weight Loss Rate of Chain Seg. Meg/gk-hr. |
|---|---|---|---|
| 0.50 wt % TNPP | 0.23 | 0.26 | 16 |
| 0.080 wt % Diethyl L-tartarate | 2.35 | 6.35 | 41 |
| 0.041 wt % Malonic acid | 2.67 | 5.38 | 40 |
| 0.044 wt % Succinic acid | 2.16 | 4.37 | 46 |
| 0.046 wt % Glutaric acid | 2.04 | 4.23 | 39 |
| 0.050 wt % Adipic acid | 1.66 | 3.85 | 37 |
| 0.043 wt % Fumaric acid | 0.81 | 2.37 | 32 |
| 0.054 wt % L-tartaric acid | 0.06 | 1.50 | 28 |
| 0.052 wt % D-tartaric acid | 0.24 | 0.35 | 24 |

Dimerized rosin is available as Sylvatec 140 from Arizona Chemicals.

Lactyl lactylate is prepared by ring opening of lactide with water.

EXAMPLE 3

Effect of Catalyst Level on Lactide Reformation Rate.

Examples 1 and 2 detail preparation of polylactide with two different catalyst levels. Table 3 shows the rate of lactide reformation for the two polylactides, when held at 260° C. in a capillary rheometer barrel.

TABLE 3

Lactide concentration and weight percent at indicated times

| Time (minutes) | Catalyst 1/10,000 | Catalyst 1/80,000 |
|---|---|---|
| After mix | 0.66 | 0.25 |
| 0 (after 5 min. preheat) | 2.03 | 0.45 |
| 5 | 4.80 | 1.45 |
| 10 | 7.43 | 3.08 |
| 20 | 7.96 | 5.56 |

The rate of lactide formation for the polymer with the higher catalyst level (1/10,000) is much higher than for the polymer with lower catalyst concentration. The rate of lactide reformation can be seen to be slowing down for the sample with higher catalyst concentration, as it begins to reach the equilibrium lactide value, believed to be 8–10 wt % at 260° C.

The lactide polymerization reaction is reversible and the rate depends on catalyst to the first power, over a range of temperatures and catalyst levels. Based on this information it is expected that the reverse reaction, lactide reformation, will also depend on the catalyst level as shown in Example 7. Example 14 of U.S. Pat. No. 5,338,822, which is incorporated herein by reference, shows the dependence of lactide reformation of catalyst level.

EXAMPLE 4

Benefit of Adding TNPP Before Polymerization Reaction

Vial polymerizations according to the procedure of Example 7 of U.S. Pat. No. 5,338,822, which is incorporated herein by reference, were used to prepare polylactide with various quantities of TNPP. The TNPP was added to the molten monomer, prior to polymerization. Tin II bis(2-ethyl hexanoate), as catalyst, was then added in a molar ratio of 1:10,000 and the mixture was pipetted into vials, sealed, and polymerized in an oil bath at 180° C. Samples were taken at various times and analyzed by gel permeation chromatography to determine the extent of reaction. Molecular weights were also determined. Number average molecular weights for 100% theoretical conversation are also reported.

TABLE 4

| Sample | Mn | Mw | % Conversion | Mn @ 100% |
|---|---|---|---|---|
| Time = 45 minutes | | | | |
| 0 | 37000 | 38000 | 16 | 229,000 |
| 0.1 wt % TNPP | 52000 | 55000 | 29 | 177,000 |
| 0.5 wt % TNPP | 54000 | 60000 | 33 | 165,000 |
| Time = 75 minutes | | | | |
| 0 | 59000 | 62000 | 32 | 183,000 |
| 0.1 wt % TNPP | 94000 | 109000 | 53 | 179,000 |
| 0.5 wt % TNPP | 94000 | 123000 | 53 | 149,000 |
| Time = 105 minutes | | | | |
| 0 | 87000 | 107000 | 64 | 135,000 |
| 0.1 wt % TNPP | 109000 | 152000 | 74 | 147,000 |
| 0.5 wt % TNPP | 115000 | 158000 | 73 | 158,000 |

The samples with TNPP are seen to have the highest conversion (fastest polymerization rate), the highest molecular weights, and as the reaction progresses, the highest ultimate molecular weights. Applicants expect that adding the stabilizer directly to the monomer mixture is likely to facilitate mixing (compared to adding to the polymer) and to provide better color.

EXAMPLE 5

Evidence of Chain Extension Behavior

The mixtures of Example 1 were tested for molecular weight after the mixing/devolatilization stage and prior to stability test. One of the phosphite treatments (TPP) and the peroxide treatment (Luperco 130XL) showed an increase in molecular weight relative to the original polymer. The TPP treated polymer had a weight average molecular weight of 263,000, the peroxide treated polymer had a weight average molecular weight of 213,000. These are higher than the original polymer, which had a weight average molecular weight of 194,000. The other treatments generally resulted in lowered molecular weights, although the TNPP was nearly unchanged.

The increase in molecular weight is believed to indicate chain linking (also known as extension or coupling) for the TPP and is consistent with crosslinking for the peroxide.

EXAMPLE 6

Demonstration of Lactide Reformation in an Extruder and Effect of Tartaric Acid

The devolatilized, dried, and pelletized polymer of Example 2, without additional additives, was continuously fed to a Warner-Pfleiter 30 mm twin screw extruder, with zone temperatures set at 250–260° C. giving a melt temperature of about 220–240° C. The polymer feed had a lactide concentration of 0.32 wt %. The extruder was run without vacuum, in order to determine whether or not lactide would be reformed at these conditions, which are typical of devolatilization temperatures. After passing through the extruder the polymer was found to have a lactide concentration of 1.40 wt %, showing that lactide was in fact being formed during the extrusion. Tartaric acid was then added directly with the polymer at the feed throat of the extruder at a rate to give 500 ppm tartaric acid, by weight, in the polymer. The lactide concentration after extrusion was now found to be only 0.39 wt %, showing that lactide reformation had been effectively reduced.

EXAMPLE 7

Rates of Lactide Polymerization and Reformation with tin(H) bis 2-ethylhexanoate Catalyst Witzke et al., "Reversible Kinetics and Thermodynamics of the Homopolymer of L-Lactide with 2-Ethylhexanoic Acid Tin (II) Salt", *Macromolecules,* vol. 30, no. 23, pp. 7075–7085, 1997, the disclosure of which is incorporated herein by reference, report on the reversible kinetics and thermodynamics for the polymerization of L-lactide as a function of catalyst level and temperature. Their results indicate that both the forward reaction and the reverse reaction (reformation of lactide) are first order in catalyst concentration. They also report an activation energy for polymerization of 71 kJ/mol, an enthalpy of −23 kJ/mol, and an entropy of −22 J/mol-K. The activation energy for depolymerization can then be taken as 71+23=94 kJ/mol-K. Using this activation energy allows calculation of relative rate constants as a function of temperature, as shown in Table 5 below and referenced to 180° C.

TABLE 5

| Temperature (C.) | Relative rate constant (ref. temp 180° C.) |
| --- | --- |
| 180 | 1 |
| 190 | 1.7 |
| 200 | 2.9 |
| 210 | 4.7 |
| 220 | 7.6 |
| 230 | 12 |
| 240 | 19 |
| 250 | 28 |
| 260 | 42 |

As shown in Table 5, the rate constant for lactide reformation is about 42 times higher at 260° C than it is at 180° C. This means that the lactide reformation after 1 minute at 260° C. is expected to be about the same as 42 minutes at 180° C.

The data in the above referenced paper can be used to estimate the time required for polymerization as a function of catalyst level and also the time for lactide reformation. Table 6 shows the estimated time to reach 90% conversion in the polymerization at 190° C. and the estimated lactide levels, for non-stabilized polymer, after 1 hour at 180° C. and after 20 minutes at 260° C., assuming no lactide in the starting polymer.

TABLE 6

| Catalyst level, mol/mol monomer (meq/kg | Time for 90% conversion at 190° C. (hrs) | Lactide reformation after 1 hr at 180° C., wt % | Lactide reformation after 20 minutes at 260° C., wt % |
| --- | --- | --- | --- |
| 1:5000 (1.39) | 0.8 | 2.6 | 7.4 |
| 1:10000 (0.69) | 1.7 | 1.9 | 7.3 |
| 1:20000 (0.35) | 3.4 | 1.2 | 7.0 |
| 1:40000 (0.17) | 6.7 | 0.68 | 5.7 |
| 1:80000 (0.09) | 13.4 | 0.36 | 3.9 |

Table 6 shows that although decreasing the catalyst level can help provide a more stable polymer, especially as measured at 180° C., the resulting polymer still may need stabilization if processed at high temperatures for long times, indicated for example, at 260° C. for 20 minutes. The drawback of lower catalyst levels is shown by the steady increase in polymerization time to reach 90% conversion. These longer times result in undesired reactions in the polymer, including color formation, molecular weight decline, and racemization. Increasing the polymerization temperature will reduce the time requirement, but also increases the rate of the degradation reactions.

EXAMPLE 8

Adding Prior to Polymerization

L-lactide available from Boehringer Ingelheim, epoxidized soybean oil available as G-62 from C.P. Hall Co., and tris-(nonylphenyl) phosphite available as Weston TNPP from General Electric were weighed into flasks to provide the compositions shown in the table below and heated to 180° C., with stirring, to melt the lactide. Tin II bis(2-ethyl hexanoate) catalyst was added at a ratio of 1 part catalyst to 20,000 parts lactide, on a molar basis. The material was then pipetted into vials, capped, and polymerized in an oil bath at 180° C. Vials were pulled at 1 hour and 2 hour for kinetic analysis. Samples for lactide reformation analysis were allowed to polymerize for about 6 hours, broken into chunks, and devolatilized under vacuum (0.4 mm Hg, absolute) at 120° C. for 26 hours. Samples were then loaded into a capillary rheometer, allowed five minutes to melt and reach the desired temperature (260° C. for this test) and samples were taken at the indicated times (to is after the five minute heat-up). Test results are reported in Table 7.

TABLE 7

| | Conversion versus polymerization time | |
| --- | --- | --- |
| Sample | t = 1 hour % conv. | t = 2 hour % conv. |
| L-lactide (Control 1) | 25.7 | 54.1 |
| L-lactide + 0.5 wt % TNPP | 35.3 | 64.1 |
| L-lactide + 0.35 wt % ESO (Control 2) | 33.0 | 76.9 |
| L-lactide + 0.35 wt % ESO + 0.35 wt % TNPP | 43.4 | 84.7 |
| L-lactide + 0.35 wt % ESO + 0.5 wt % TNPP | 52.5 | 87.7 |

The addition of TNPP to the monomer mixture, prior to polymerization, resulted in an increase in the conversion over the control samples, either for the lactide homopolymer or the poly(lactide-co-epoxidized soybean oil). The increases were observed for both the 1 hour and 2 hour samples.

Table 8 shows the number average molecular weight ($M_n$), measured relative to polystyrene standards using GPC: (1) for the samples after polymerizing (prior to devolatilizing); (2) after devolatilization; (3) after the five minute heating time (t=0 minutes); (4) after 10 minutes at 260° C.; and (5) after 20 minutes at 260° C. The specific rate of degradation is calculated at 260° C. as the rate of molecular weight change between time (3) and time (5), calculated as meq/(kg*min).

TABLE 8

| Sample | Time 1 | Time 2 | Time 3 | Time 4 | Time 5 | rate |
|---|---|---|---|---|---|---|
| L-lactide (Control 1) | 92400 | 77200 | 60300 | 51800 | 37400 | 0.51 |
| L-lactide + 0.5 wt % TNPP | 94200 | 76800 | 71100 | 64800 | 53400 | 0.23 |
| L-lactide + 0.35 wt % ESO (Control 2) | 93500 | 81600 | 67400 | 57800 | 42500 | 0.44 |
| L-lactide + 0.35 wt % ESO + 0.35 wt % TNPP | 100500 | 88300 | 76300 | 76300 | 69500 | 0.06 |
| L-lactide + 0.35 wt % ESO + 0.5 wt % TNPP | 105800 | 88200 | 91800 | 81000 | 71000 | 0.16 |

The addition of TNPP to the monomer mixture, prior to polymerization, resulted in a more stable polymer as reflected in the greater retention of molecular weight of the TNPP treated samples relative to the controls. The protection was obtained for both the poly(L-lactide) and the copolymer, poly(lactide-co-epoxidized soybean oil). The specific rate of chain scission was less than ½ of the control value for the TNPP treated material. Results for the weight average molecular weight are generally similar.

The results of the lactide reformation experiments at 260° C. are shown in Table 9. The lactide content was determined on films pressed from the samples and analyzed by FTIR. Lactide is expressed in wt %.

TABLE 9

| Sample | Lactide @ $t_0$ | Lactide @ 20 min. | Lactide increase |
|---|---|---|---|
| L-lactide (Control 1) | 3.51 | 7.52 | 4.01 |
| L-lactide + 0.5 wt % TNPP | 0.50 | 2.33 | 1.83 |
| L-lactide + 0.35 wt % ESO (Control 2) | 3.30 | 7.45 | 4.15 |
| L-lactide + 0.35 wt % ESO + 0.35 wt % TNPP | 2.06 | 2.09 | 0.03 |
| L-lactide + 0.35 wt % ESO + 0.5 wt % TNPP | 2.27 | 2.21 | −0.06 |

The TNPP greatly reduces the rate of lactide reformation in the polymer, relative to the untreated controls.

EXAMPLE 9

A polylactide polymer composition was prepared in a batch reactor at a temperature of about 180° C. The monomer mixture include lactide, 0.35 wt % epoxidized soybean oil (available as G-62 from C.P. Hall Co.), with 0.015 wt % of trinononylphenyl phosphite (available as Weston TNPP from General Electric). Catalyst was added at a molar ratio of catalyst to lactide of 1:80,000. The catalyst was tin II bis(2-ethyl hexanoate), which is available as Dabco T-9 from Air Products and Chemicals, Inc. The mixture was polymerized for about 10 hours and then devolatilized, providing a polymer composition with a number average molecular weight of 88,000, a weight average molecular weight of 200,000, and a PDI of 2.3. The polymer had an optical composition of 1.5% R-lactic acid residuals and 96.2% S-lactic acid residuals.

Various additives listed in Table 10 were mixed into the polylactide using a Plasticorder head at a temperature of 180° C. for 2 minutes. The polymer was then dried in a vacuum oven. Samples were then placed into a capillary rheometer; which was used to heat the samples and hold them at the desired testing temperature for 20 minutes (not including a 5 minute heat-up time). Samples were taken after the 5 minute heat-up (t-zero), and at 10 and 20 minutes. FTIR was used to determine the lactide content and GPC was used to measure molecular weight. The results are shown in the table below.

TABLE 10

| Sample | | Change in lactide, wt % | | Rate of chain scission, |
|---|---|---|---|---|
| Weight % | Material | 10 minutes | 20 minutes | meq/kg-hr |
| | Control 1 | 0.88 | 3.83 | 40 |
| | Control 2 | 1.46 | 3.37 | 38 |
| 0.054 | L-tartaric acid | 0.23 | 1.79 | 43 |
| 0.05 | L-tartaric acid | 0.23 | 1.97 | 41 |
| 0.05 | D-tartaric acid | 0.06 | 0.54 | 34 |
| 0.1 | L-tartaric acid | 0.09 | 1.12 | 42 |
| 0.1 | D-tartaric acid | 0.01 | 0.21 | 27 |
| 0.047 | L-malic acid | 0.59 | 2.16 | 41 |
| 0.1 | L-malic acid | 0.19 | 1.09 | 41 |
| 0.043 | t-aconitic acid | 1.26 | 4.27 | 44 |
| 0.049 | itaconic acid | 1.01 | 3.29 | 42 |
| 0.043 | maleic acid | 0.85 | 3.79 | 44 |
| 0.044 | fumaric acid | 0.76 | 2.78 | 36 |
| 0.044 | pyromellitic acid | 1.13 | 2.59 | 41 |
| 0.062 | phthalic acid | 1.37 | 4.71 | 44 |

We claim:

1. A lactic acid residue containing polymer composition comprising:
   (a) polylactide polymer having a number average molecular weight of between about 25,000 and about 200,000;
   (b) lactide, if present at all, is present in a concentration of less than 0.5 wt. % based on the weight of the lactic acid residue containing polymer composition;
   (c) between about 0.01 and about 2 wt. % catalyst deactivating agent having a molecular weight greater than about 500, wherein the catalyst deactivating agent includes, on average, more than two carboxylic acid groups per molecule.

2. A lactic acid residue containing polymer composition according to claim 1, wherein the deactivating agent comprises polyacrylic acid.

3. A lactic acid residue containing polymer composition according to claim 2, wherein the catalyst deactivating agent comprises a polycarboxylic acid having a molecular weight greater than 1,000.

4. A lactic acid residue containing polymer composition according to claim 1, wherein the catalyst deactivating agent comprises polyacrylic acid provided at a concentration of between 0.04 wt % and 0.3 wt %.

5. A lactic acid residue containing polymer composition according to claim 1, wherein the catalyst deactivating agent comprises a polycarboxylic acid having at least one carboxylic acid group per 250 a.m.u.

6. A lactic acid residue containing polymer composition according to claim 1, wherein the polylactide polymer comprises a tin catalyzed polylactide polymer.

7. A lactic acid residue containing polymer composition according to claim 1, wherein the catalyst deactivating agent comprises a hydrolyzed anhydride polymer.

8. A lactic acid residue containing polymer composition according to claim 1, wherein the polylactide polymer has a number average molecular weight within a range of 75,000 and 125,000.

9. A lactic acid residue containing polymer composition according to claim 1, wherein the catalyst deactivating agent comprises a polycarboxylic acid having a molecular weight greater than 20,000.

10. A lactic acid residue containing polymer composition according to claim 1, wherein the catalyst deactivating agent is provided at a concentration of 0.01 to 2 wt % and comprises a multifunctional carboxylic acid having a separation between acid groups of not more than six carbon atoms apart inclusive of the carbonyl carbon.

11. A lactic acid residue containing polymer composition according to claim 1, wherein sample thereof will generate less than 1 wt % lactide after heating to 260° C. for 20 minutes.

12. A lactic acid residue containing polymer composition according to claim 1, wherein:
   (i) the polylactide polymer has a number average molecular weight of between 45,000 and 105,000; and
   (ii) the composition exhibits a melt flow index of between 10 and 50 according to ASTM D1238 at 210° C. and a 2.16 Kg weight.

13. A lactic acid residue containing polymer composition according to claim 1, wherein:
   (i) the polylactide polymer has a number average molecular weight of between 50,000 and 90,000; and
   (ii) the composition exhibits a melt flow index of between 16 and 30 according to ASTM D1238 at 210° C. and a 2.16 Kg weight.

14. A lactic acid residue containing polymer composition according to claim 1, wherein:
   (i) the composition exhibits a melt flow index of 2 to 30 according to ASTM D1238 at 210° C. with a 2.16 Kg weight; and
   (ii) the polymer composition exhibits a die swell ratio of greater than 1.25 when tested according to ASTM D1238 with a 0.0825 inch diameter die at 210° C. and 2.16 Kg weight;
   (iii) the polylactide polymer has a weight average molecular weight of between 50,000 and 400,000.

15. A lactic acid residue containing polymer composition according to claim 1, wherein:
   (i) the composition further comprises 1 to 40 weight percent plasticizer; and
   (ii) the polylactide polymer exhibits a weight average molecular weight of between 50,000 and 400,000.

16. A lactic acid residue containing polymer composition according to claim 1, wherein:
   (i) the composition exhibits a melt flow index of between 6 and 10 according to ASTM D1238 at 210° C. with a 2.16 Kg weight; and
   (ii) the polylactide polymer has a weight average molecular weight of between 160,000 and 350,000.

17. An article formed from the lactic acid residue containing polymer composition according to claim 1.

18. A fiber formed from the lactic acid residue containing polymer composition according to claim 1.

19. A coating formed from the lactic acid residue containing polymer composition according to claim 1.

20. A film formed from the lactic acid residue containing polymer composition according to claim 1.

21. A molding formed from the lactic acid residue containing polymer composition according to claim 1.

22. A lactic acid residue containing composition comprising polylactide polymer having a number average molecular weight of between 25,000 and 200,000, and between 0.01 and 2 wt. % catalyst deactivating agent, wherein the lactic acid residue containing composition is sufficiently stable to lactide reformation that a sample thereof, devolatilized to provide a lactide concentration of less than 1 wt % and a water concentration of less than 500 ppm, will generate less than 2 wt % lactide after heating to 260° C. for 20 minutes.

23. A method for stabilizing a lactic acid residue containing polymer composition, the process comprising steps of:
   (a) providing a lactic acid residue containing polymer composition comprising polylactide polymer having a number average molecular weight of between 25,000 and 200,000;
   (b) introducing into said lactic acid residue containing polymer composition catalyst deactivating agent having a molecular weight of greater than 1000 and in an amount of between 0.01 wt % and 2 wt % based on the weight of the lactic acid residue containing polymer composition.

24. A lactic acid residue containing polymer composition prepared according to the method of claim 23.

25. A method according to claim 23, further comprising a step of:
   (a) devolatilizing said lactic acid residue containing polymer composition containing deactivating agent at a temperature of between about 200° C. and about 260° C. and a pressure of less than 10 mm Hg to provide a lactide concentration of less than 1 wt %.

* * * * *